(12) United States Patent
Vinther et al.

(10) Patent No.: US 12,448,730 B2
(45) Date of Patent: Oct. 21, 2025

(54) PREPARATION OF CELLULOSE FIBERS (71) Applicant: Jena Trading ApS, Høng (DK)

(72) Inventors: Per Vinther, Høng (DK); John Mark Lawther, Roskilde (DK)

(73) Assignee: JENA TRADING APS, Høng (DK)

( * ) Notice: Subject to any disclaimer, the term of this patent is extended or adjusted under 35 U.S.C. 154(b) by 1126 days.

(21) Appl. No.: 17/424,962

(22) PCT Filed: Jan. 21, 2020

(86) PCT No.: PCT/EP2020/051429
§ 371 (c)(1),
(2) Date: Jul. 22, 2021

(87) PCT Pub. No.: WO2020/152178
PCT Pub. Date: Jul. 30, 2020

(65) Prior Publication Data
US 2022/0081833 A1   Mar. 17, 2022

(30) Foreign Application Priority Data
Jan. 22, 2019 (EP) .................................... 19153123

(51) Int. Cl.
| D21C 5/00 | (2006.01) |
|---|---|
| D21C 9/00 | (2006.01) |
| D21C 9/02 | (2006.01) |
| D21C 9/08 | (2006.01) |
| D21C 9/10 | (2006.01) |
| D21C 9/16 | (2006.01) |
| D21C 9/18 | (2006.01) |

(52) U.S. Cl.
CPC .............. *D21C 5/005* (2013.01); *D21C 9/007* (2013.01); *D21C 9/02* (2013.01); *D21C 9/08* (2013.01); *D21C 9/1005* (2013.01); *D21C 9/1052* (2013.01); *D21C 9/163* (2013.01); *D21C 9/18* (2013.01)

(58) Field of Classification Search
CPC .......... D21C 5/005; D21C 9/007; D21C 9/02; D21C 9/08; D21C 9/1005; D21C 9/1052; D21C 9/163; D21C 9/18
USPC ............................................................. 8/401
See application file for complete search history.

(56) References Cited

U.S. PATENT DOCUMENTS

| 1,715,194 | A | 5/1929 | Garcia |
|---|---|---|---|
| 2,275,630 | A | 3/1942 | Johnson et al. |
| 2,275,661 | A | 3/1942 | Steinle et al. |
| 2,662,893 | A | 12/1953 | Kurth |
| 2,804,271 | A | 8/1957 | Pressing et al. |
| 5,882,114 | A | 3/1999 | Fukuyo et al. |
| 7,192,524 | B2 | 3/2007 | Almagro |
| 7,972,826 | B2 | 7/2011 | Larsen et al. |
| 8,123,864 | B2 | 2/2012 | Christensen et al. |
| 8,187,848 | B2 | 5/2012 | Larsen et al. |
| 8,187,849 | B2 | 5/2012 | Larsen |
| 9,328,312 | B2 | 5/2016 | Kumar et al. |
| 2004/0076732 | A1 | 4/2004 | Valix |
| 2007/0079944 | A1 | 4/2007 | Amidon et al. |
| 2007/0199669 | A1* | 8/2007 | Yang ................ D21C 3/02 162/96 |
| 2009/0126719 | A1 | 5/2009 | Almagro |
| 2012/0107887 | A1 | 5/2012 | Chheda et al. |
| 2013/0095318 | A1 | 4/2013 | Cabello et al. |
| 2015/0368584 | A1 | 12/2015 | Anderson et al. |
| 2017/0202895 | A1 | 7/2017 | Hugh |
| 2017/0202896 | A1 | 7/2017 | Hugh |
| 2019/0249363 | A1 | 8/2019 | Frick et al. |

FOREIGN PATENT DOCUMENTS

| BR | 9006044 | | 6/1991 | |
|---|---|---|---|---|
| BR | 9201830 | A * | 11/1993 | |
| CN | 101225448 | | 7/2008 | |
| CN | 101558166 | * | 10/2009 | ............. C12N 9/244 |
| CN | 102329693 | | 1/2012 | |
| CN | 102431073 | | 5/2012 | |
| CN | 102812178 | A | 12/2012 | |
| CN | 102864015 | | 1/2013 | |
| CN | 203333621 | U | 12/2013 | |
| CN | 106574207 | A | 4/2017 | |
| DE | 4431394 | | 2/1996 | |
| EP | 0339509 | | 4/1989 | |
| EP | 0337653 | A2 * | 10/1989 | ............... D21C 1/06 |
| FI | 86952 | * | 7/1992 | ........... C08B 30/042 |
| GB | 1056468 | | 1/1967 | |
| JP | S54068402 | A | 6/1979 | |
| JP | H8013367 | A | 1/1996 | |

(Continued)

OTHER PUBLICATIONS

Geng et al. (2018). Effect of Delignification on Hemicellulose Extraction from Switchgrass, Poplar, and Pine and Its Effect on Enzymatic Convertibility of Cellulose-rich Residues. BioResources 13(3), 4946-4963.*
European Patent Office, Extended European Search Report for EP App No. 19153123.5 mailed Jun. 19, 2019.
International Searching Authority, International Search Report and Written Opinion for International App No. PCT/EP2020/051429 mailed Jun. 17, 2020.
International Preliminary Examining Authority, Written Opinion of the Preliminary Examining Authority for International Application No. PCT/EP2020/051429 mailed Feb. 23, 2021.
International Search Report and Written Opinion for Application No. PCT/EP2015/062497 dated Sep. 22, 2015 (9 pages).
TBH Web Team: "From Desert Plants to Dollars: Candelilla Wax Makind, and Wax Products", The University of Texas at Austin, Apr. 20, 2004 Retrieved from the Internet: URL:http://www.texasbeyondhistory.net/waxcamps/techniques.html [retrieved on Sep. 9, 2015] (16 pages).

(Continued)

*Primary Examiner* — Amina S Khan
(74) *Attorney, Agent, or Firm* — Lisa Mueller; Tristan A. Fuierer; Casimir Jones SC (57) ABSTRACT

The present invention provides a method of producing an improved cellulose pulp consisting of cellulose fibers of a desired length, such as cellulose fibers having a length-weighted average fiber length Lc(l)>0.6 mm and its use in cellulose pulp-comprising products, such as packaging material with improved properties.

13 Claims, 2 Drawing Sheets

(56) References Cited

FOREIGN PATENT DOCUMENTS

| | | | |
|---|---|---|---|
| JP | 2003147690 A | 5/2003 | |
| WO | 9516013 | 6/1995 | |
| WO | WO 1995/016013 A1 | 6/1995 | |
| WO | WO 9616013 | 6/1995 | |
| WO | 03092628 | 11/2003 | |
| WO | WO 03/0923628 | 11/2003 | |
| WO | WO-2006028499 A2 * | 3/2006 | .......... B01F 7/00816 |
| WO | 2006047445 | 5/2006 | |
| WO | WO-2006082437 A1 * | 8/2006 | ............ C11B 1/104 |
| WO | 2009031164 A1 | 3/2009 | |
| WO | 2010104458 A1 | 9/2010 | |
| WO | 2011057413 A1 | 5/2011 | |
| WO | WO-2012047832 A2 * | 4/2012 | ................ C12P 7/10 |
| WO | WO-2015185685 A1 * | 12/2015 | ............. C10L 5/442 |
| WO | 2016013946 A1 | 1/2016 | |
| WO | 2016134195 A1 | 8/2016 | |
| WO | 2018069168 A1 | 4/2018 | |
| WO | 2018086672 A1 | 5/2018 | |

OTHER PUBLICATIONS

Written Opinion of the International Preliminary Examining Authority for Application No. PCT/EP2015/062497 dated May 11, 2016 (7 pages).

Search Report from Danish Patent and Trademark Office for Application No. 2014 70324 dated Nov. 24, 2014 (3 pages).

International Search Report and Written Opinion for Application No. PCT/EP2015/062501 dated Aug. 19, 2015 (8 pages).

Search Report from Danish Patent and Trademark Office for Application No. 2014 70325 dated Nov. 24, 2014 (3 pages).

Sin, Emily H. K., "Table 1.1: Common Wax Classes" The extraction and fractionation of waxes from biomass, Jun. 2012, p. 41.

Sin, Emily H. K., "Figure 2.43: Typical GC chromatogram of solvent wheat straw wax (Viscount 09) extract (originally in colour)," The extraction and fractionation of waxes from biomass, Jun. 2012, p. 118.

Indian Office Action dated Aug. 19, 2019 issued in Indian Application No. 201617041184, 6 pages.

Chinese Office Action dated Aug. 2, 2019 and English Translation, issued in Chinese Application No. 201580040918.1, 21 pages.

Internatinal Search Report and Written Opinion for Application No. PCT/EP2015/062501 dated Aug. 19, 2015 (8 pages).

TBH Web Tea: "From Deseart Plants to Dollars: Candelilla Was Makind, and Wax Products." The University olf Texax at Austin, Apr. 20, 2004, Retreived from the internet: URL: http://www.texasbeyondhistory.net/wascamps/techniques.html [retrieved on Sep. 9, 2015] (16 pages).

\* cited by examiner

PREPARATION OF CELLULOSE FIBERS

FIELD OF THE INVENTION

The present invention concerns a process for fractionating cellulose, hemicellulose, and lignin from plant material, thereby providing cellulose, hemicellulose, and lignin products with improved properties for application in bioproducts. More specifically, the present invention provides a method of producing an improved cellulose pulp from cereal straw consisting of cellulose fibers of a desired length, such as cellulose fibers having a length-weighted average fiber length Lc(l)>0.6 mm and its use in cellulose pulp-comprising products, such as packaging material with improved properties.

BACKGROUND OF THE INVENTION

Utilizing plant material for obtaining bioproducts has obtained increasing research and commercial interest over the last decade. Numerous methods and products have been suggested to utilize plant biomass as a promising alternative to substitute e.g. petrochemical sources for fuel and other chemical products.

Lignocellulosic plant biomasses comprise the most abundantly available raw material on the Earth for the production of bioproducts. It is composed of cellulose, hemicellulose and lignin together with small amounts of protein, pectin, wax and different inorganic compounds.

Cellulose is an organic compound with the formula $(C_6H_{10}O_5)_n$, a polysaccharide consisting of a linear chain of several hundred to many thousands of $\beta(1\rightarrow 4)$ linked D-glucose units. Cellulose is an important structural component of the primary cell wall of plants and the most abundant organic polymer on Earth. Cellulose is a straight chain polymer; the molecule adopts an extended and rather stiff rod-like conformation, aided by the equatorial conformation of the glucose residues. The multiple hydroxyl groups on the glucose from one chain form hydrogen bonds with oxygen atoms on the same or on a neighbor chain, holding the chains firmly together side-by-side and forming microfibrils with high tensile strength which themselves arrange into fibres. This confers tensile strength in cell walls, where cellulose microfibrils and fibres are meshed into a polysaccharide matrix, often further embedded in lignin in lignocellulosic plant stems. Such cellulose fibers are of special interest for use in different bioproducts, such as in the pulp and paper industry, however, plant-derived cellulose is usually found in a mixture with hemicellulose, lignin, pectin and other substances.

A hemicellulose is any of several heteropolymers, such as xylan, glucuronoxylan, arabinoxylan, glucomannan, and xyloglucan, present along with cellulose in almost all plant cell walls. Hemicellulose typically (but not exclusively) has a random, amorphous structure with little strength and can be hydrolyzed by dilute acid or base as well as by myriads of hemicellulase enzymes. The hemicellulose polysaccharides contain many different sugar monomers. For instance, sugar monomers in hemicellulose can include xylose, mannose, glucose, galactose, rhamnose, and arabinose. Hemicelluloses contain most of the D-pentose sugars, and occasionally small amounts of L-sugars as well. Xylose is in most cases the sugar monomer present in the largest amount, although in some plant material mannose can be the most abundant sugar. Not only regular sugars can be found in hemicellulose, but also their acidified form, for instance glucuronic acid and galacturonic acid can be present. Hemicelluloses are an important source of different sugar monomers which can be obtained by chemical or enzymatic degradation.

Lignin is a cross-linked racemic macromolecule; it is relatively hydrophobic and aromatic in nature. The degree of polymerisation in nature is difficult to measure, since it is fragmented during extraction and the molecule consists of various types of substructures that appear to repeat in a haphazard manner. There are three monolignol monomers, methoxylated to various degrees: p-coumaryl alcohol, coniferyl alcohol, and sinapyl alcohol. Lignin fills the spaces in the cell wall between cellulose, hemicellulose, and pectin components, especially in vascular and support tissues. It is often covalently linked to hemicellulose and therefore cross-links different plant polysaccharides, conferring mechanical strength to the cell wall and by extension the plant as a whole. Components of lignin are used in different processes, including oil additives, agricultural chemicals, cement additives, water treatment, glues and adhesives as a partial replacement of phenol, and dyes used for textiles.

Lignocellulosic biomass can be used as such, for example in the pulping industry. However, different components of the lignocellulosic biomass can be utilized for different purposes, such as in different bioproducts. The obstacle is how to "unlock" the individual components from the complex lignocellulosic matrix. Lignocellulose has evolved to resist degradation and to confer hydrolytic stability and structural robustness to the cell walls of the plants. This robustness is caused by crosslinking between the carbohydrate polymers cellulose and hemicellulose, and the lignin via ester and ether linkages.

The physical and chemical barriers in the lignin-carbohydrate supramolecular structure render most plant cell wall components almost completely unavailable for direct conversion into commercial products. Thus successful conversion strategies must lead to the disruption of this structure and result in partial or total separation of the lignocellulosic components, increasing the accessibility of cellulose, hemicelluloses and lignins. It should also minimize the formation of by-products. Each technology applied has its own characteristics and is usually applied to access and purify a specific source of carbohydrates and lignins.

Different pretreatment methods include acidic conditions (e.g. sulfuric acid for hydrolyzing hemicellulose), alkaline conditions (e.g. calcium/sodium/potassium hydroxide or ammonia for removal of lignin), organosolv processes (e.g. organic solvents for extraction of lignin), oxidative delignification (e.g. hydrogen peroxide for generation of hydroxyl radicals which degrade lignin, or ozone for attacking the aromatic ring structures of lignin, or wet oxidation, where oxygen in combination with water at elevated temperature and pressure solubilize hemicellulose and degrade lignin), biological methods (e.g. various lignocellulolytic microbes, especially filamentous fungi which secrete enzymes for oxidative and/or hydrolytic degradation of the various biomass components), microwave irradiation (e.g. microwaves causing localized heating of biomass leading to disruption the lignocellulosic architecture), etc.

Plant leaf and stem surfaces are coated with a layer of waxy material that has a myriad of functions. More specifically, the primary aerial plant surfaces are covered by a cuticle, acting as the essential permeability barrier toward the atmosphere. It is a heterogeneous layer composed mainly of lipophilic compounds, namely cutin and intracuticular wax with epicuticular waxes deposited on the surface. Plant wax composition does not only vary between plant species, but also between locations within a single species down to the subcuticular level. Wax comprises linear very-long chain (VLC) compounds, including varying ratios of acids, primary and secondary alcohols, esters, aldehydes, alkanes, and ketones. In addition, cyclic compounds such as pentacyclic triterpenoids occur in the wax of many species.

The outer wax layer (epicuticular wax) can in many cases be mechanically stripped from the surfaces; while a subsequent liberation and extraction can release additional intracuticular wax. Such extraction has traditionally been by use of organic solvents such as chloroform, benzene and hexane followed by solvent evaporation and purification; and recently, an extraction process using supercritical $CO_2$ has been disclosed. Further, the removal of wax by hydrothermal and wet oxidation pretreatment of straw has been disclosed. The removal of wax by different pretreatment methods has been disclosed, but the full potential of doing so has not been explored.

More recently, the present inventors disclosed a method for separation of wax from plant fines (WO2015/185685A1), such as cereal straw fines, including a first dry mechanical treatment step to separate a wax enriched fraction from a fiber rich fraction low in wax; and a second step of enzymatic treatment of the wax enriched fraction to facilitate removal of residual non-wax plant material, such as protein material, present on the wax-fines to purify the wax. The purified plant wax is an excellent product for use as an alternative to wax prepared from the petrochemical industry for use in, e.g. the cosmetic industry. It was speculated that the "waste" fiber rich fraction can be used as a source of combustible material (improved combustion process with less pollution and less tar), as litter for domestic animals (excellent absorbency properties), or for the conversion to biofuel and/or similar downstream products.

Conventional pulping involves very harsh treatment of the cellulosic biomass to get rid of the hemicellulose and lignin—such as described in US2012/0107887, where a cellulose pulp stream was prepared from lignocellulosic biomass by strong alkali treatment at high temperature (100-230° C.). It was further suggested to wash and concentrate the pulp and subject the washed-pulp stream to oxygen delignification and mechanical refining. The final pulp was subsequently hydrolyzed using cellulases for producing fermentable sugars for later alcohol fermentation. In example 2 of the present invention, the pulping method of US2012/0107887 was repeated using wheat straw as biomass (samples 11 and 12). From this, it is obvious that such traditional pulping process does not yield long fibers, compared to the present invention.

Another method of preparing a fiber rich cellulose fraction by a mild method of treating lignocellulosic material (as compared to e.g. standard "sulfite process" or "kraft process" of pulping) was disclosed in WO2018/086672A1. Mean fiber lengths of approx. 0.85 mm are reported in WO2018/086672A1, determined by analysis using a Lauritzen and Wettre automated fibre analyser. However, it is not specified which mean fiber length value is used: lc(n), lc(l) or lc(w). Fiber length may be reported as lc(n), lc(l) or lc(w), as defined in Carvalho et al [1997, TAPPI journal 80(2):137-142] where lc(n)=numerical average length, lc(l) =length-weighted average length, and lc(w)=weight-weighted average length. Standard Lauritzen and Wettre automated fiber analyzers provides all three values. In Example 2 of the present invention, the method of WO2018/086672A1 was repeated (sample 8) and corresponding lc(n), lc(l) and lc(w) value were reported in table 1. From this, it is obvious that the mean fiber length values reported in WO2018/086672A1 are lc(w) values.

SUMMARY OF THE INVENTION

With multiple suggested uses for all components of plant material, the present invention acknowledges the need for a method by which all main components of lignocellulose can be liberated, separated, and purified; preferably a method where accessing one component is not done at the cost of disrupting another, as is the drawback with many of the harsh pretreatment methods previously applied. The present invention provides the benefit of being non-disruptive, hence facilitating the option of additionally purifying hemicellulose, lignin and even wax for other uses.

The present method provides an improvement over the art by providing a method by which cellulose is separated from wax, hemicellulose and lignin, and the bundles of cellulose fibers loosened (defibrillated) in a gentle way, such that the length of the cellulose fibers in the cellulose fraction can be controlled, such as to preferably obtain long cellulose fibers. The method facilitates a controlled production of a cellulose fiber product with improved fiber length, i.e. fibers of a desired length. The ability to control fiber length is essential for different downstream applications; e.g. as is demonstrated by the data of the present invention, fiber length correlates with for example folding endurance. The present invention thereby provides an alternative to the traditional pulping method for producing cellulose fiber products. The cellulose fiber product of the present invention may be used in molded pulp materials such as packaging materials, where the ability to control the fiber length allows for optimal use of the fibers. As demonstrated in the present invention, longer fibers are preferred for use in bendable packaging materials, such as in egg boxes with a lid made in one piece, as folding endurance of fiber sheets improves with increased fiber length.

The present invention concerns a process for accessing, separating, and isolating cellulose, hemicellulose and lignin from plant material, resulting in improved cellulose, hemicellulose and lignin products for downstream processing.

More specifically, the present method provides a method of producing cellulose fibers having an average fiber length lc(l)>0.6 mm.

In one aspect, the invention concerns a method of isolating and preparing cellulose fibers of a desired length lc(l) from cereal straw, said method comprising the steps of:
 (i) providing dewaxed straw material in aqueous suspension,
 (ii) adjusting the pH to alkaline conditions and increasing the temperature of the solution in step (i) to solubilize hemicellulose and lignin components in the aqueous phase,
 (iii) separating the material obtained in step (ii) into a solid cellulose fiber fraction and a liquid fraction comprising hemicellulose and lignin components,
 (iv) suspending said cellulose fiber fraction obtained in step (iii) in an aqueous liquid, adjusting the temperature to 65-95° C. and pH to 9-11.5, adding a bleaching agent, and keeping said cellulose fiber fraction in suspension for 60-180 minutes (T1),
 (v) subjecting the bleached material obtained in step (iv) to a wet mechanical treatment,
 (vi) obtaining a cellulose fiber product by separating the material obtained in step (v) into a bleached-refined solid cellulose fiber fraction and an aqueous bleaching liquor fraction, and
 (vii) optionally washing the bleached-refined cellulose fiber fraction in an aqueous liquid.

wherein the length-weighted average fiber length lc(l) of the cellulose fibers is >0.6 mm, and wherein said dewaxed straw material is obtained by subjecting said cereal straw to a pretreatment comprising dry mechanical treatment and enzymatic treatment.

The method may further comprise an additional step (v') following step (v), prior to step (vi), wherein said additional step (v') comprises:

(v') continuing bleaching at temperature 65-95° C. and pH 9-11.5 for a duration of 20-90 minutes (T3) without wet mechanical treatment.

In another aspect, the invention concerns a cellulose pulp product obtainable by the method described above, wherein the cellulose fibers in said cellulose pulp product has a length-weighted average fiber length lc(l)>0.6 mm, such as >0.65 or >0.7 mm. The invention further concerns a product comprising cellulose fibers of the invention, wherein said cellulose fibers make up at least 25%, such as a least 35 or 45% of the total amount of cellulose fibers in the product.

In yet another aspect, the invention concerns the use of cellulose fibers of the invention in preparation of solid products for use in e.g. building or packaging materials, wherein said cellulose fibers in said products make up at least 25%, such as a least 35 or 45% of the total amount of cellulose in the products

DETAILED DESCRIPTION OF THE INVENTION

Definitions

"Plant/lignocellulosic material" or "plant/lignocellulosic biomass" means a wide and varied group of plant parts from many species, preferably non-woody biomasses. It includes grasses, rushes, gourds, stems, roots, seeds/husks, and leaves, etc. An important structural component of plant material is cellulose which almost always occurs in a mixture with hemicelluloses and lignin. The terms "plant", "biomass", and "lignocellulosic material" are used interchangeably.

"Cellulose" means a polysaccharide built up from β-D-glucose units. D-glucose ($C_6H_{12}O_6$) is a saccharide containing five hydroxyl functional groups and an aldehyde group on carbon-1. Cellulose is a straight chain polymer; hydroxyl (—OH) groups form hydrogen bonds with atoms on neighboring chains to connect them, forming microfibrils. Cellulose exhibits both crystalline and amorphous regions. Many properties of cellulose depend on its degree of polymerization, the number of glucose units that make up one polymer molecule.

"Hemicellulose" means an often branched type of polysaccharide, derived from several sugars including xylose, mannose, glucose, galactose, rhamnose, and arabinose. In the present invention, the definition of hemicellulose further means hemicellulose derived products such as oligosaccharides and sugar monomers derived by hydrolysis of the hemicellulose.

"Lignin" is a complex cross-linked racemic polymer comprising various phenyl propane units. It is relatively hydrophobic and aromatic in nature. There are three monolignol monomers, methoxylated to various degrees: p-coumaryl alcohol, coniferyl alcohol, and sinapyl alcohol. These lignols are incorporated into lignin in the form of the phenylpropanoids p-hydroxyphenyl (H), guaiacyl (G), and syringyl (S), respectively. In the present invention, the definition of lignin further means lignin derived products.

"Wax" or "waxy components" means all various forms of wax in the plant material, including wax at the surface of the plant (epicuticular wax) as well as wax inside the plant (intracuticular wax). Wax comprises linear very-long chain (VLC) compounds, including varying ratios of fatty acids, primary and secondary alcohols, esters, aldehydes, free fatty acids, alkanes, and ketones. In addition, cyclic compounds such as pentacyclic triterpenoids, alkylresorcinols, sterols, and steryl esters occur in the wax of many species. Lipids making up plant cell walls are not considered to be "wax" in the present context.

"Dewaxed lignocellulosic material" means plant material which has been treated in a way that removes wax from the plant material, such as more than 50, 55, 60, 65, 70, 75, 80, 85, 90%, or even more than 95% of all plant wax has been removed, wherein the wax content is determined by the method provided in this application (section II).

"Dry mechanical treatment" relates to a method for separating wax from a dried wax coated plant material, comprising the steps of mechanically processing the plant material in a dry process by using an apparatus adapted for deforming at least the outer surface of the plant material, such as by cutting, chopping, and/or crushing, so that the wax coating is cracked and released from the remaining, partly de-waxed plant material.

"Protease" (EC 3.4) is any enzyme which digests long protein chains into shorter fragments by splitting the peptide bonds that link amino acid residues.

"Pectinase" (EC 3.2. is any enzyme which is directly involved in breaking down pectin.

"Hemicellulase" belongs to the group carboxyl ester hydrolases (EC 3.1.1) and comprises any enzyme which is directly involved in breaking down hemicellulose. Feruloyl esterase (EC 3.1.1.73) is an example of a "hemicellulase".

"Ligninase" is any enzyme which is involved in the breakdown of lignin, also referred to as lignolytic enzymes, such as peroxidases and laccases.

"Wet mechanical treatment" is in the present context a mechanical treatment of the wettreated straw in the bleaching liquid to separate the fiber from the bundles of fibers making up the majority of the straw. The treatment should result in a separation of the individual fibers without disrupting or breaking the individual fiber. It may be performed using a refiner, such as a refiner known from the standard paper pulping industry, including e.g. conical refiners and disc type refiners, operated at ambient or atmospheric pressure: so-called "atmospheric refining". The wet mechanical treatment of the cellulose suspension comprising a beaching agent relates to a method of partially or fully defibrillating fiber bundles. Alternatively, wet mechanical treatment may be performed by wet milling to shear or crush solids suspended in a liquid (slurry), such as using e.g. a toothed colloid mill.

"Defibrillated cellulose fiber bundles" means the cellulose fiber bundles are partially or fully separated into single cellulose fibers.

"Alkaline conditions" (or "alkaline pH") means pH above 7, measured by techniques trivial to a person skilled in the art.

"Bleaching agent" means a substance that has the ability to oxidize other substances (cause them to lose electrons). Common oxidizing agents are oxygen, hydrogen peroxide and the halogens.

"Fiber length" may be reported as lc(n), lc(l) or lc(w), as defined in Carvalho et al [1997, TAPPI journal 80(2):137-142] where lc(n)=numerical average length, lc(l)=length-weighted average length, and lc(w)=weight-weighted average length.

I. Method of Preparing Cellulose Fibers of a Desired Length

Figure 1:
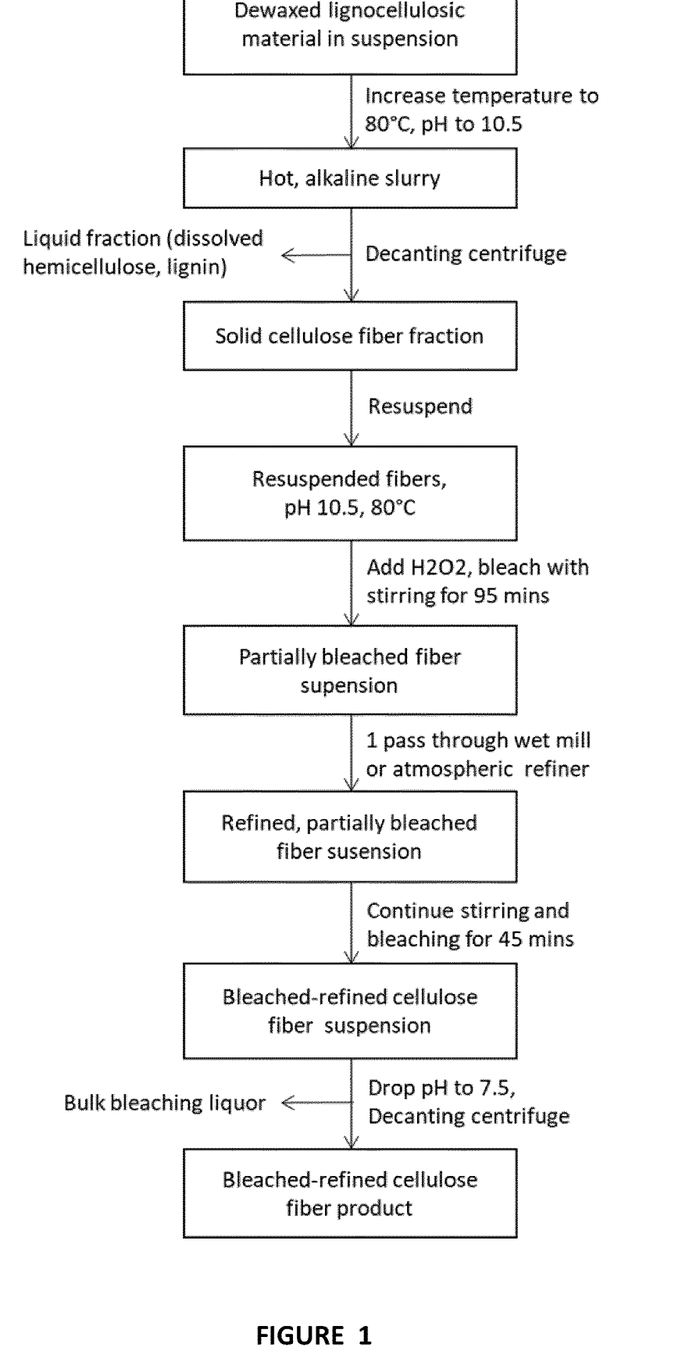
FIG. 1 illustrates different process steps of the invention.

FIG. 1 provides an in illustrative example of the present invention, outlining the different process steps to arrive at the desired products. All process steps may be performed as illustrated, some steps may be left out, some steps may be combined, and additional steps may be added. A detailed description is given in the following sections.

In one aspect, the present invention concerns a method accessing, separating, and isolating cellulose, hemicellulose and lignin products from plant material after cuticular wax has been removed for industrial use, yielding improved products with desired properties for further downstream processing. In a preferred embodiment, the present invention provides an alternative way of pulping plant-based cellulose by providing a method of isolating and preparing cellulose fibers of a desired length from cereal straw, comprises the steps of:

(i) providing dewaxed straw material in aqueous suspension, (ii) adjusting the pH to alkaline conditions and increasing the temperature of the solution in step (i) to solubilize hemicellulose and lignin components in the aqueous phase, (iii) separating the material obtained in step (ii) into a solid cellulose fiber fraction and a liquid fraction comprising hemicellulose and lignin components, (iv) suspending said cellulose fiber fraction obtained in step (iii) in an aqueous liquid, adjusting the temperature to 65-95° C. and pH to 9-11.5, adding a bleaching agent, and keeping said cellulose fiber fraction in suspension for 60-180 minutes (T1), (v) subjecting the bleached material obtained in step (iv) to a wet mechanical treatment, (vi) obtaining a cellulose fiber product by separating the material obtained in step (v) into a bleached-refined solid cellulose fiber fraction and an aqueous bleaching liquor fraction, and (vii) optionally washing the bleached-refined cellulose fiber fraction in an aqueous liquid.

wherein the fiber length lc(l) of the cellulose fibers is >0.6 mm, and wherein said dewaxed straw material is obtained by subjecting said cereal straw to a pretreatment comprising dry mechanical treatment and enzymatic treatment.

According to step (i) of the method of the present invention, dewaxed cereal straw material is provided in aqueous suspension. In a preferred embodiment, the dewaxed cereal straw material of the invention originates from straws, husks or brans from cereal, selected from the group consisting of wheat, rye, barley, oats, sorghum, rice, triticale, etc. and combinations thereof.

In another embodiment the method of the present invention may be applied to dewaxed lignocellulosic material originates from lignocellulosic biomass, preferably a non-woody biomass, such as an annual plant, such as grasses, sugar cane, palm leaves, bagasse, high energy grasses, or other plants. It has surprisingly been discovered that removal of cuticular wax before the treatment to obtain cellulose fibers is critical for obtaining long fibers in the present invention.

In one embodiment, the dewaxed material has been treated in a way whereby more than 50% of the wax has been removed, such as treated in a way whereby more than 55, 60, 65, 70, 75, 80, 85, 90%, or even more than 95% of all plant wax covering the surface of the plant material has been removed.

Dewaxed biomass material may be obtained by any known method in the art, such as pretreating lignocellulosic biomass by mechanically stripping the wax from the surface; organic solvents extraction such as using chloroform, benzene and hexane; and use of supercritical $CO_2$; or even by hydrothermal and wet oxidation pretreatment.

Based on the pretreatment method applied, the resulting dewaxed material may be in different form, such as pellets or even partly of fully suspended as a result of a previous treatment.

In a preferred embodiment, the dewaxed cereal straw material is obtained by subjecting straw to a pretreatment comprising dry mechanical treatment and enzymatic treatment.

In one embodiment of the present invention the dry mechanical pretreatment comprises cutting, chopping, and/or crushing, such as a mechanical treatment selected from the group consisting of shredding, hammer milling, disc milling grinding and combinations thereof. WO2015/185688 discloses an example of a dry mechanical pretreatment of plant material.

The cereal straw material may be cut in lengths suitable for a subsequent treatment in a suitable mill for deforming the plant material. The primary chopping may results in cuts between about 5 and 20 cm in length, between 5 and 15 cm, or between 5 and 10 cm in length. The milling further minces the plant material to pieces of less than 5 cm in length, less than 3 cm, less than 2 cm, or less than 1 cm. The processes can be optimized to adjust the sizes according to the downstream use of the mechanically treated plant material.

The dry mechanical pretreatment may serve to deform the outer surface of the plant material so that the wax coating is cracked and released, obtaining a partly dewaxed plant material.

In one embodiment, the material obtained from the dry mechanical pretreatment is fractionated according to size prior to the enzymatic pretreatment. In a preferred embodiment, the dry mechanically pretreated material is subjected to a sieving treatment in order to obtain two fractions, the first fraction passing through the sieve mesh and the second fraction being retained by the sieve mesh. In an embodiment of the present invention, the mesh size of the sieve is in the range of 0.1-5 mm, such as in the range from 0.15-2 mm, e.g. in the range from 0.2-0.5 mm. In a preferred embodiment, the mesh size is 0.3 mm. The sieving treatment may comprise one or more sieves having the same or different mesh sizes. The sieving treatment may be performed in order to separate partly dewaxed plant material (the second fraction retained by the sieve) from a fraction enriched in cracked and released wax (the first fraction passing through the sieve). Preferably, at least 65%, such as at least 75%, such as at least 80% of the total wax in the lignocellulosic biomass is removed by sieving.

In an alternative embodiment, fractionation may be omitted and thus directly applying enzymatic pretreatment to the dry mechanically pretreated material.

In one embodiment of the invention, the enzymatic pretreatment is hydrolysis using one or more enzymes selected from the list: proteases, pectinases, hemicellulases, and ligninases.

In a preferred embodiment, the dry mechanically pretreated material is suspended in an aqueous liquid together with one or more protease and/or pectinase enzymes, and the temperature and pH are adjusted to optimize the activity of the enzyme(s) added.

In a further embodiment of the invention, the enzymatic pretreatment comprises:
(a) enzymatic treatment of the lignocellulosic biomass using two or more different enzymes selected from the list: proteases, pectinases, hemicellulases, and ligninases to liberate cellulose from hemicellulose, lignin and wax;
(b) removal of the liberated wax to provide dewaxed solid lignocellulosic material in aqueous suspension.

In another aspect of the present invention, the wax may be removed together with the hemicellulose and lignin after the enzyme treatment.

In another embodiment of the invention, the enzymatic pretreatment comprises:
(a) a first enzymatic treatment of the dry mechanically treated lignocellulosic biomass in an aqueous suspension with a protease and/or pectinase to liberate wax;
(b) removal of the liberated wax; and
(c) a second enzymatic treatment of the lignocellulosic biomass after removal of the wax using one or more enzymes selected from the list: proteases, pectinases, hemicellulases, and ligninases to liberate cellulose from hemicellulose and lignin to provide the dewaxed lignocellulosic material in aqueous suspension.

Proteases are involved in digesting long protein chains into shorter fragments by splitting the peptide bonds that link amino acid residues. In one embodiment, proteases applied in the enzymatic pretreatment may be selected among proteases which detach the terminal amino acids from the protein chain (exopeptidases, such as aminopeptidases, carboxypeptidase A). In another embodiment, proteases may be selected among pectinases which attack internal peptide bonds of a protein (endopeptidases, such as trypsin, chymotrypsin, pepsin, papain, elastase); or from the group consisting of serine proteases, threonine proteases, cysteine proteases, aspartate proteases, glutamic acid proteases and metalloproteases. In yet another embodiment the proteases may be selected from commercially available proteases, such as selected from the group consisting of Alcalase®, (a protease from *Bacillus licheniformis*) Neutrase® (a protease from *Bacillus amyloliquefaciens*, both being available from Novozymes, Denmark) and Promod® (a protease from *Ananas comosus*, available from BioCatalysts, UK). In yet another embodiment, a combination of two or more protease enzymes or commercial protease enzyme products may be used for degrading the plant proteins.

Pectinases are involved in breaking down pectin, a polysaccharide found in plant cell walls, wherein e.g. cellulose fibrils are often embedded. In one embodiment, pectinases applied in the enzymatic pretreatment may be selected from a group consisting of (i) pectin hydrolases which hydrolyse the pectic acid backbone in pectins (endopolygalacturonase, EC 3.2.1.15; exopolygalacturonase, EC 3.2.1.67), (ii) pectin lyases which degrade pectic acid via elimination rections (endopolygalacturonase lyase, EC 4.2.2.2; exopolygalacturonase lyase, EC 4.2.2.9; endopolymethyl-d-galactosiduronate lyase, EC 4.2.2.10), and (iii) pectin esterase, which cleave the methyl ester bond (pectin methyl esterase, EC 3.1.1.11). Pectinases are widely available commercially and most are blends which incorporate all three mentioned enzyme types. In another embodiment, the pectinases may be selected from a group consisting of Pectinex® (a mix of pectinases from *Aspergillus Niger*, available from Novozymes, Denmark) and Pectinase 947 L® (a pectinase mix available from BioCatalysts, UK; Pektozyme, a range of Pectin active enzyme blends supplied by DuPont). In yet another embodiment, a combination of two or more pectinase enzymes or commercial pectinase enzyme products may be used for degrading the plant pectins.

A combination of two or more protease(s) and/or pectinase(s) and/or commercial protease product(s) and/or commercial pectinase product(s) may be applied for degrading the plant proteins and/or pectins.

In an embodiment the one or more enzymes may be added to obtain an enzyme concentration in the range from 0.01-2% w/w, such as in the range of 0.03-1.8% w/w, e.g. in the range of 0.05-1.6% w/w, such as in the range of 0.07-1.4% w/w, e.g. in the range of 0.09-1.2% w/w. The enzyme concentration depends on the enzyme activity however, it may be preferred that the enzyme concentration is 1-2% w/w.

In one embodiment of the present invention it may be preferred that the enzyme activity is in the range from 1000-12000 U/g, such as in the range of 2000-10000 U/g, e.g. in the range of 3000-9000 U/g, such as in the range of 4000-8000 U/g, e.g. in the range of 5000-7000 U/g.

In order to benefit as much as possible from the enzyme treatment, the conditions for enzyme activity, such as temperature, pH, salt concentration, etc., should be optimized with respect to the enzyme(s) used. Addition of acid or base to the slurry/mixture may be necessary to reach optimal pH conditions.

Optimal temperature during enzyme treatment is selected to suit the enzyme(s) used. The temperature may be 25, 30, 35, 40, 45, 50° C. or even higher if thermostable enzymes are used. In one embodiment, the temperature of the mixture in step (d) is adjusted in the range of 30-70° C., such as in the range of 35-65° C., e.g. in the range of 40-60° C., e.g. in the range of 45-55° C., preferably in the range of 45-65° c., most preferably in the range of 50-60° C. to optimize the activity of the enzymes used in performing targeted hydrolysis of cell wall components.

In a further embodiment, the pH maintained during the enzyme treatment is in the range of 3.5-7.0, such as in the range of 4.0-7.0, e.g. in the range of 4.0-6.0, preferably in the range 4.5-5.5 to optimize the activity of the enzymes used in performing targeted hydrolysis of cell wall components. The pH may be adjusted by adding at least one acid and/or buffer selected from the group consisting of phosphoric acid, hydrochloric acid, sulfuric acid, phosphate buffers, acetate buffers, and combinations thereof. In a preferred embodiment the acid is phosphoric acid.

In order to obtain an optimal exposure of the biomass components to the enzymes, agitation is preferably applied and may be selected from the group consisting of stirring and/or compressed air or gas bubbling agitation and/or vessel-shaking. Applicable stirrers may be selected from the group consisting of anchor stirrers, blade stirrers, K-stirrers, paddle stirrers or any combinations thereof.

In a further embodiment, the pretreatment of the cereal straw further comprises a wet mechanical treatment during the enzymatic treatment. The wet mechanical treatment may be simultaneous with the enzyme treatment or a subsequent mechanical treatment. A limited wet mechanical treatment is preferred, such as for a selected, optimized, intermittent, time period during enzyme treatment. In an embodiment of the invention, the wet mechanical treatment is selected from the group consisting of conical refiners, disc type refiners, carried out at ambient pressure (so-called atmospheric refining) and combinations thereof; or wet milling such as toothed colloid mill. Such wet refining or milling may be repeated as many times as desired: 1, 2, 3 or 4 repetitions will normally suffice. Alternatively, or additionally, very powerful stirring may be applied.

In a preferred embodiment the hydrolysis and wet mechanical treatment under agitation in the pre-treatment is performed for 0.5-5.0 hours such as in the range of 0.5-4.0 hours, e.g. in the range of 0.5-3.0 hours, e.g. in the range of 1.0-2.5 hours, e.g. in the range of 1.0-2.0 hours, e.g. preferably in the range of 1.0-1.5 hours, preferably for 1.5 hours.

Once the enzymatic treatment is considered to be sufficient, the wax may be removed, recovering the dewaxed solid lignocellulosic material. The dewaxed lignocellulosic material may be recovered by raising the temperature of the mixture to melt and liquefy the liberated wax, such that the dewaxed lignocellulosic material can be separated from a liquid part comprising the melted waxes. The wax may be fully or partly liquefied dependent on the composition of the wax and the temperature. When the temperature is raised in order to melt the liberated wax, it is desirable to minimum reach at temperature at which the enzymes are inactivated.

In one embodiment, the temperature of the dry mechanically and enzymatically pretreated material is increased to 65-95° C., such as in the range from 70-90° C., e.g. in the range from 75-85° C., such as in the range from 80-85° C. and preferably to 80° C. in order to melt and liquefy the liberated wax. In one embodiment, the temperature is increased to above 70° C., preferably above 80, 90 or 95° C.

In one embodiment, the removal of wax and recovery of dewaxed material is performed by a method selected from the group consisting of decanting, centrifugation, and filtration. In principle, any known method which can be applied to remove an insoluble fiber fraction from a bulk aqueous suspension may be applied. Preferably, the separation is performed by any form of sieving/filtration, using any molecular size as desired. In respect of filtration such filtration may be selected from small mesh filter, pressurized filter, belt filter, filter press and combinations thereof.

The dewaxed material may be pelleted or treated in other ways to facilitate easy handling of the material. Or it may be partly of fully suspended in an aqueous liquid as a result of a previous treatment, such as the above described.

In a preferred embodiment, the dewaxed cereal straw material is obtained by a method of extracting or separating the wax using a combination of mechanical and enzymatic treatment as described above. A similar method of dewaxing plant material is described in WO 2015/185685. However, in WO 2015/185685, wax was liberated by enzymatic treatment only from the plant fines (fraction enriched in wax content and low in fiber content after mechanical treatment); while in a preferred embodiment of the present invention, the dewaxing is performed on the plant fraction high in fiber content after mechanical treatment, or performed on all plant material without any separation of the mechanically treated plant material.

In a preferred embodiment of the present invention, the pretreatment of the cereal straw to obtain dewaxed straw material comprises the step of:
(a) providing cereal straw,
(b) subjecting the cereal straw to a dry mechanical treatment,
(c) subjecting the material obtained in step (b) to a sieving treatment and obtaining at least two fractions, the first fraction passing through the sieve mesh and the second fraction being retained by the sieve mesh,
(d) suspending the second fraction obtained in step (c) in an aqueous liquid together with one or more protease and/or pectinase enzymes,
(e) subjecting the mixture obtained in step (d) to wet mechanical treatment,
(f) removing wax from the solution,
(g) enzymatically treating the remaining dewaxed material obtained in step (f) using one or more hemicellulase enzymes.

In a further embodiment, the biomass is enzymatically pretreated using one or more hemicellulase enzymes suitable for degrading hemicellulose components. The side chains of hemicellulose interlink with lignin in the complex lignocellulosic plant biomass structure. Disruption of the hemicellulose is therefore an essential step in separating the different lignocellulosic components. The hemicellulases may be applied (i) in combination with the protease and/or pectinase treatment described above, (ii) as a separate treatment prior to or after protease and/or pectinase treatment, (iii) or even as a separate treatment of dewaxed lignocellulosic after wax has been removed.

In one embodiment, the hemicellulase enzymes are xylanases (EC 3.2.1.8) which randomly break the internal linkages of the linear polysaccharide beta-1,4-xylan (back bone of most hemicelluloses), yielding different lengths of xylo-oligosaccharides or if the reaction is run to its completion, yielding xylose monomers. However, hemicellulose is not merely a linear polysaccharide of beta-1,4-xylan; it further comprises numerous side chains, requiring separate enzyme action for their degradation. The high degree of substitution in hemicellulose polymers thus requires the action of various accessory enzymes, therefore in another embodiment, the hemicellulase enzymes include different glycoside hydrolases and carbohydrate esterases, to completely degrade the hemicellulose substituents. In a preferred embodiment, ferulic esterase is such accessory enzyme of the invention, which hydrolyzes feruloyl-polysaccharides, releasing ferulate by acting on the carboxylic ester bond. Ferulic esterase may be added to aid in the release of lignin moieties bound to hemicellulose.

In one embodiment, enzymes for degradation of hemicellulose (hemicellulases) may be selected from a group consisting of glycoside hydrolases and/or carbohydrate esternases, such as selected from the list of endo-xylanase, beta-xylosidase, alpha-L-arabinofuranosidase, alpha-glucurondiase, alpha-galatosidase, acetylxylan esterase, feruloyl esterase, etc. Beta-glucanases, which can act on bonds in non-crystalline cellulose in the plant cell wall, are further optionally utilized.

Hemicellulose preparations are widely available commercially. In one embodiment, the hemicellulase may be selected from a group consisting of Depol 333P (xylanase rich enzyme preparation from BioCatalysts Ltd, UK) and Depol 740L (a ferulic esterase rich enzyme preparation from BioCatalysts Ltd, UK). In a preferred embodiment, a combination of two or more hemicellulase enzymes or commercial hemicellulase enzyme products may be used for degrading the plant hemicellulose.

In an embodiment the one or more hemicellulase enzymes may be added to obtain an enzyme concentration in the range from 0.01-2% w/w, such as in the range of 0.03-1.8% w/w, e.g. in the range of 0.05-1.6% w/w, such as in the range of 0.07-1.4% w/w, e.g. in the range of 0.09-1.2% w/w. The enzyme concentration depend on the enzyme activity however, it may be preferred that the enzyme concentration is 1-2% w/w.

In one embodiment of the present invention it may be preferred that the hemicellulase enzyme activity is in the range from 1000-12000 U/g, such as in the range of 2000-10000 U/g, e.g. in the range of 3000-9000 U/g, such as in the range of 4000-8000 U/g, e.g. in the range of 5000-7000 U/g.

In order to benefit as much as possible from the enzyme treatment, the conditions for enzyme activity, such as temperature, pH, salt concentration, etc., should be optimized with respect to the enzyme(s) used. Addition of acid or base to the slurry/mixture may be necessary to reach optimal pH conditions.

Optimal temperature during hemicellulase treatment is selected to suit the enzyme(s) used. The temperature may be 25, 30, 35, 40, 45, 50° C. or even higher if thermostable enzymes are used. In one embodiment, the temperature is adjusted in the range of 30-70° C., such as in the range of 35-65° C., e.g. in the range of 40-60° C., e.g. in the range of 45-55° C., preferably in the range of 45-65° c., most preferably in the range of 50-60° C. to optimize the activity of the enzymes used in performing targeted hydrolysis of cell wall components.

In a further embodiment, the pH during hemicellulase treatment is adjusted in the range of 3.5-7.0, such as in the range of 4.0-7.0, e.g. in the range of 4.0-6.0, preferably in the range 4.5-6.0 to optimize the activity of the enzymes used in performing targeted hydrolysis of cell wall components. The pH may be adjusted by adding at least one acid and/or buffer selected from the group consisting of phosphoric acid, hydrochloric acid, sulfuric acid, phosphate buffers, acetate buffers, and combinations thereof. In a preferred embodiment the acid is phosphoric acid.

In a preferred embodiment, the temperature and pH during hemicellulase treatment are in the range 45-65° C. and pH 4.5-6.0.

In order to obtain an optimal exposure of the biomass components to the enzymes, agitation is preferably applied and may be selected from the group consisting of stirring and/or compressed air or gas bubbling agitation and/or vessel-shaking. Applicable stirrers may be selected from the group consisting of anchor stirrers, blade stirrers, K-stirrers, paddle stirrers or any combinations thereof.

In a further embodiment, the hemicellulase treatment may comprise a wet mechanical treatment during the enzymatic treatment. The wet mechanical treatment may be simultaneous with the hemicellulase treatment or a subsequent mechanical treatment. A limited wet mechanical treatment is preferred, such as for a selected, optimized, intermittent, time period during hemicellulase treatment. In an embodiment of the invention, the wet mechanical treatment is selected from the group consisting of conical refiners, disc type refiners, carried out at ambient pressure (so-called atmospheric refining) and combinations thereof; or wet milling such as toothed colloid mill. Such wet refining or milling may be repeated as many times as desired: 1, 2, 3 or 4 repetitions will normally suffice. Alternatively, or additionally, very powerful stirring may be applied.

The hemicellulase treatment is considered to be sufficient, e.g. a desired degree of hydrolysis is obtained, after 0.5, 1.0, 1.5, 2.0, 2.5, 3.0, 3.5, 4.0, 4.5 or 5.0 hours of hydrolysis, or even after 6, 8, or 12 hours of hydrolysis. In a preferred embodiment, hydrolysis in is performed for 0.5-5.0 hours such as in the range of 0.5-4.0 hours, e.g. in the range of 1.0-3.5 hours, e.g. in the range of 1.5-3.0 hours, e.g. preferably in the range of 1.5-2.5 hours, preferably for 2 hours.

In another embodiment, the biomass may also be enzymatically pretreated using one or more enzymes suitable for degrading lignin components. The ligninases may be applied in combination with any of the other enzyme treatments described above or as a separate step. In one embodiment, the ligninases are selected from the group consisting of peroxidases and laccases.

According to step (ii) of the present invention, the temperature of the solution comprising dewaxed cereal straw provided in step (i) is increased and the pH is adjusted to alkaline conditions to solubilize hemicellulose and lignin components in the solution.

In one embodiment, the temperature of the solution comprising dewaxed cereal straw material provided in step (i) is increased to 65-120° C., such as to the range 65-95° C., e.g. to the range 75-85° C., such as to the range 80-85° C. and preferably to 80° C. In one embodiment, the temperature of the solution comprising dewaxed lignocellulosic material provided in step (i) is increased to above 65° C., preferably above 70, 80, 90 or 95° C.

In one embodiment, the alkaline pH conditions in step (ii) refer to pH range 7.0-12.0, such as range 8.0-12.0, such as range 9.0-11.5, such as range from 9.5-11.0, e.g. range 10.0-10.5 and preferably range from 10.0-11.0. The pH adjustment of the solution provided in step (i) to obtain alkaline conditions may be performed by adding a base selected from the group consisting of sodium hydroxide, potassium hydroxide, calcium hydroxide, ammonium hydroxide, sodium carbonate and combinations thereof.

It may be preferred that the solution in step (ii) is agitated for 5-60 minutes, preferably 10-45 minutes, most preferred 10-20 mins.

In a preferred embodiment, the temperature is increased to 65-95° C. and pH to 9-11.5 to ensure hemicellulose and lignin are solubilized, while the cellulose remains insoluble.

According to step (iii) of the present invention, the material obtained in step (ii) is separated into a solid cellulose fiber fraction and a liquid fraction comprising hemicellulose and lignin components. The cellulose fiber product may be separated from the solution by any known method of separating an insoluble fraction from a bulk aqueous suspension.

In one embodiment, the separation in step (iii) is selected from the group consisting of decanting, centrifugation, and filtration. Separation may be performed by any form of sieving/filtration, using any molecular size as desired. In respect of filtration such filtration may be selected from small mesh filter, pressurized filter, belt filter, filter press, filter band and combinations thereof. Preferably the separation is performed by a decanter centrifuge.

The dry matter content of the cellulose fiber fraction obtained in step (iii) may be less than 45%, preferably less than 40, 35, 30, 25, 20, 15, or even less than 10%. The dry matter content of the cellulose fiber fraction obtained in step (iii) is preferably in the range 15-35%, such as 20-30%, such as 25%.

The cellulose fiber fraction obtained in step (iii) may optionally be washed to facilitate further removal of hemicellulose and lignin components.

According to step (iv) of the present invention, the cellulose fiber fraction obtained in step (iii) is suspended in an aqueous liquid, and the temperature and pH is adjusted to 65-95° C. and pH 9-11.5, a bleaching agent is added, and the cellulose fiber fraction kept in suspension for a time T1.

In order to allow free stirring of the mixture during the treatment of the cellulose fiber fraction it may be preferred that the cellulose fiber fraction obtained in step (iii) is suspended in step (iv) in an aqueous liquid at a ratio of 10:1, such as 30:1, preferably 20:1 (water to cellulose fiber material).

In one embodiment, the bleaching agent added in step (iv) is selected from the group consisting of hydrogen peroxide, chlorine, hypochlorite, chlorine dioxide, sodium percarbonate, active oxygen, ozone, or other bleaching agents, or mixtures thereof. In a preferred embodiment, the bleaching agent is hydrogen peroxide, the pH is 10.0-11.0 and the temperature 60-100° C.

In an embodiment the bleaching agent is added by dispending a specified amount of a 30% w/v hydrogen peroxide solution to the cellulose fiber fraction; preferably 15-30 kg hydrogen peroxide solution per 100 kg fiber fraction is added, such as 25 kg per 100 kg fiber faction.

In a further embodiment, the pH is in step (iv) adjusted within the range 7-12, such as 8-12, such as 9-11.5, or such 10-11, preferably pH 10.5; while the temperature is above 50° C., preferably above 60, 65, 70, 75, 80, 85, 90° C. or even higher. In a further embodiment the temperature of step (iv) is adjusted in the range of 60-110° C., such as in the range from 60-100° C., e.g. in the range from 70-90° C., such as in the range from 75-85° C., preferably at 80° C. In a preferred embodiment, temperature and pH are adjusted to 65-95° C. and pH 9-11.5

According to step (v) of the present invention, after the time T1, the bleached material obtained in step (iv) is refined by a wet mechanical treatment for a duration of T2. T2 may be measured as numbers of passes through a "refiner".

Three phases of bleaching are preferred: First, bleaching is initiated as specified in step (iv) and the specified temperature and pH are maintained for selected period of time T1. Second, the bleached material obtained after T1 is refined by a wet mechanical treatment for a selected period of time T2 as specified in step (v). Third, optionally, bleaching may be continued after the wet mechanical treatment for a selected period of time T3.

Allowing the cellulose fibers to be bleached for a selected period of time T1 prior to performing the refining by wet mechanical treatment is an essential parameter in terms of controlling the finally achieved length of the cellulose fibers. Without wishing to be bound by theory, it was surprisingly discovered in the present invention that to obtain long fibers, it is critically important to refine (wet mechanically treat) the fiber bundles at a stage at which the bundles are not brittle but rather are flexible and free of encrusting lignin, i.e. after a selected time T1 of bleaching. If T1 e.g. is omitted (or too short) the fiber product will have a reduced mean fiber length. At this selected time T1, a limited refining process is performed for the duration of time T2 to generate the finished fibers of a desired length.

In a preferred embodiment, bleaching is conducted for T1 of at least 30, 35, 40, 45, 50, 60, minutes before wet mechanical treatment, such as T1 in the range 20-240 minutes before wet mechanical treatment, e.g. T1 in the range 30-180 minutes, e.g. T1 in the range 60-180 minutes, e.g. T1 in the range 60-120 minutes, e.g. T1 in the range 70-100 minutes, such as preferably T1 conducted for 75-95 minutes prior to initiating the wet mechanical treatment step.

After the time T1, the bleached material obtained is refined by a wet mechanical treatment for the duration of time T2. In an embodiment of the invention, the wet mechanical treatment in step (v) is refining, such as the well-known and used refining methods in paper making. In a preferred embodiment, the wet mechanical treatment is selected from the group consisting of conical refiners, disc type refiners, and combinations thereof, carried out at ambient or atmospheric pressure (so-called atmospheric refining). Wet milling may also be applied as a wet mechanical treatment, such as using a toothed colloid mill. The objective of the wet mechanical treatment is to defibrillate the fiber bundles present in the straw pulp, develop individual fibers without over-shortening, and enhance the bonding between pulp fibers in a final wet-formed product compared to the original fiber bundles.

As an example, a disc refiner typically comprises rotating discs having serrated or otherwise contoured surfaces. Two disc rotate in opposite direction (one clockwise, the other counterclockwise), or one may be stationary while the other rotates. The fiber slurry is pumped through the center of one of the discs and as centrifugal force throws the fiber/fiber bundle slurry toward the perimeter of the discs, it is sandwiched between them. The action of the rotating discs can rub, roll, cut, fray, and help soften the fibers, as well as break up fiber bundles. The space between the discs can be adjusted, depending on the degree of refining desired. In continuous refining systems, the type of pulp, the degree of refining, and the type and quantity of fillers can be altered easily depending on the type of paper or pulp needed. A conical refiner (well known in the paper industry), will also suffice.

Wet mechanical refining as described above may be repeated. In one embodiment, 1, 2, or 3 passes (repetitions) through the refiner is performed. A single pass means that all of the fibers/pulp liquid passes through the refiner plates or mill once (i.e. pumping from one tank to another via the refiner). Two passes means it is passed through a second time, etc. etc.

The time T2 is preferably expressed as of the number passes through the refiner or mill.

In a preferred embodiment, the wet mechanical treatment in step (v) is conducted as 1 or 2 passes through a refiner or mill. Therefore, in a preferred embodiment, T2 is 1-2 passes. In a more preferred embodiment, wet mechanical treatment in step (v) is conducted as 1 pass through a refiner. Therefore, in a more preferred embodiment, T2 is 1 pass.

As noted above, T2 is the refining time during the bleaching process, and may be referred to as the number of passes through a wet mill or a refiner. In practice, ideally, the biomass slurry is pumped from one tank to the next through the refiner, so that all of the fiber suspension passes through the refiner or wet-mill in "a single pass". In several of the examples given herein, fibrous suspension was passed through a Fryma type, toothed colloid, wet-mill at a specified plate or tooth gap of 1-1.5 mm. It was found that for obtaining long fibers, a single pass is optimal. A full tank (1400 liters) took 20 mins to pass through, hence T2 often appears as "20 mins" in the examples.

In several other examples given herein, the fibrous suspension was passed through a Sprout Waldron model 105-A pilot-scale single rotating disc atmospheric refiner. The atmospheric refiners (as opposed to "pressurized refiners") are typically used with a plate gap of 15 thousandths of an inch (350-400 microns) using 12 inch plate, and 1 pass was found to give very similar results to the wet-mill example.

A single pass through the Sprout Waldron model 105-A pilot-scale single rotating disc atmospheric refiner was found optimal. In case that another type of refiner is used, another plate gap and/or plate size and/or flowrate may apply. Hence, the number of optimal passes may be different based on the properties of the selected machine, plate gap, plate size, flowrate. One or more of the plate gap, plate size, flowrate, and/or number of passes should to be adjusted to confer the same result (fiber length) as obtained using the Sprout Waldron refiner defined above—to thereby obtain optimal degree of refining for obtaining longest fibers.

The time period (minutes) of a single pass through a refiner or mill depends on the type of refiner or mill used, as the flowrate of each may vary. As illustrative examples, the flowrate of a Fryma type, toothed colloid wet-mill is around 70 liters/min; such that one pass of 1400 liters through a Fryma type, toothed colloid wet-mill takes approx. 20 minutes; while the flowrate of a Sprout Waldron model 105-A pilot-scale single rotating disc atmospheric refiner is with a refining plate diameter of 12 inch is around 3000-5000 liters/hour, such that one pass of 1400 liters through a Sprout Waldron model 105-A pilot-scale single rotating disc atmospheric refiner with a plate gap of 15 thousandths of an inch (350-400 microns) using 12 inch plate takes approx. 16-28 minutes.

Therefore, the time T2 may be within the range 0.6-1.2 seconds/liter sample processed in the wet mechanical treatment, e.g. T2 in the range 0.7-1.0 seconds/liter, e.g. T2 in the range 0.7-0.85 seconds/liter, if using the Sprout Waldron refiner.

In a preferred embodiment, for obtaining long fibers, the refining step (T2) should be equivalent to a single pass through the Fryma type, toothed colloid, wet-mill as specified above, or equivalent to a single pass through the Sprout Waldron refiner as specified above. The skilled person would know how to adapt other refiners or similar machines to obtain the same degree of refining.

Two or more passes through the refiner may be performed consecutively or with a specified time interval between passes. In this case, T2 is defined as the total wet mechanical treatment time; therefore in the case where the wet mechanical treatment comprises more than one pass through a refiner, the time in between passes is also included in time T2.

In a further embodiment, according to step (v') of the invention, bleaching may be continued for a specified time T3 after the wet mechanical treatment, such as continued for T3 of 5, 10, 15, 20, 25, 30, 35, 40, 45, 50, 55, 60 minutes or even continued for T3 of more than one hour, such as for T3 of more than 1.5, 2, 2.5 or even 3 hours. In a preferred embodiment, bleaching in step (v') is continued for a specified time period T3 within the range 20-120 minutes, e.g. T3 in the range 20-90 minutes, e.g. T3 in the range 20-60 minutes, e.g. T3 in the range 40-95 minutes, such as preferably conducted for T3 in the range 25-60 minutes.

T1, T2 and T3 are selected based on a correlation between the desired fiber length and T1, T2, and T3. Preferred times for T1, T2 and T3 may depend on different parameters such as the lignocellulosic biomass input used as starting material for the preparation of the cellulose fibers (type of biomass as well as extent of dewaxing), as well as the beaching agent and the refiner used. As mentioned previously, it is speculated that residual lignin is disassociated from the lignocellulose complex and flexibility of the cellulose fibers increased during T1; beneficial for generating longer fibers. During T2 refining, the fiber product of desired length is generated. Extended refining time T2 leads to shorter fibers, while with a shorter refining time T2, the fiber bundles may not be well separated into the more desired single cellulose fibers. T3 provides a further optional period of bleaching after the fiber bundles have been opened up via the controlled wet-mechanical action during T2. T3 thereby facilitates a final removal of residual lignin and hemicellulose (pH is 10.5) and is further considered an optional "finishing" stage, wherein without wishing to be bound by theory the previously bundled fibers further spread out to single free fibers.

T1, T2, and T3 will be different depending on the desired fiber length. Optimal T1, T2, and T3 for a desired fiber length may be determined experimentally for different lignocellulosic biomasses. The periods T1, T2 and T3 may also be calculated and deduced in a more sophisticated way for example by use of computational programs, such as JMP statistical analysis software, SAS Institute A/S, which can without undue burden guide a person skilled in the art in selecting different times T1, T2, and T3 for testing based on few initial experimental results; and then based on the output preferred values for T1, T2 and T3 for obtaining the desired fiber length are identified.

Total bleaching time (T1+T2+T3) should not exceed 220 minutes, such as not exceed 210, 200, 180, or 170 minutes; most preferably not exceed 160 minutes.

In one embodiment, bleaching during times T1, T2, and optionally T3 is conducted at pH within the range 7-12, such as 8-12, such as 9-11.5, or such 10-11, preferably pH 10.5; while the temperature is above 50° C., preferably above 60, 65, 70, 75, 80, 85, 90° C. or even higher. In a further embodiment bleaching during times T1, T2, and optionally T3 is conducted at a temperature in the range of 60-110° C., such as in the range from 60-100° C., e.g. in the range from 70-90° C., such as in the range from 75-85° C., preferably at 80° C. In a preferred embodiment, bleaching is conducted using hydrogen peroxide, for at duration of times T1, T2, and optionally T3, at temperature 65-95° C. and pH 9-11.5.

Additional bleaching agent may be added at any time during T1, T2 and/or T3.

In a preferred embodiment, in order to obtain optimal mixing, agitation is preferably applied in step (iv) and (v) as well as during any continued bleaching; and may be selected from the group consisting of stirring and/or compressed air or gas bubbling agitation and/or vessel-shaking. Applicable stirrers may be selected from the group consisting of anchor stirrers, blade stirrers, K-stirrers, paddle stirrers or any combinations thereof.

According to step (vi) of the present invention, a cellulose fiber product is obtained by separating the material obtained in step (v) into a bleached-refined cellulose fiber fraction and an aqueous bleaching liquor fraction. In principle, any known method which can be applied to remove an insoluble fraction from a bulk aqueous suspension may be applied.

In one embodiment, the separation in step (vi) is selected from the group consisting of decanting, centrifugation, and filtration. Separation may be performed by any form of sieving/filtration, using any molecular size as desired. In respect of filtration such filtration may be selected from small mesh filter, pressurized filter, belt filter, filter press, filer band and combinations thereof. Preferably the separation is performed by a decanter centrifuge.

The dry matter content of the bleached-refined cellulose fiber product may be less than 45%, preferably less than 40, 35, 30, 25, 20, 15, or even less than 10%.

According to step (vii) of the invention, the bleached-refined cellulose fiber fraction may optionally be washed in water, such as by rinsing with fresh water or resuspending in fresh water with subsequent re-separation as described above for step (vi).

In a further aspect of the invention, the liquid fraction comprising hemicellulose and lignin obtained in step (iii) as described above may be further treated to separate and purify the hemicellulose and lignin based on their different properties. In a preferred embodiment, the pH of the liquid is lowered prior to separation to precipitate the lignin, such as by lowering the pH to less than pH 7, preferably less than pH 6, 5, 4, 3, 2, or even lower. Separation may be carried out by any know method such as centrifugation. In a preferred embodiment of the invention, the hemicellulose rich aqueous fraction will be further separated by e.g. ultrafiltration using a cutoff such as 1, 2, 3, 4 or 5 kDa, or even higher such as 10 kDa, separating higher molecular weight polysaccharide material from lower weight oligosaccharide material. The separated fractions may in a preferred embodiment be freeze dried to obtain more stable products.

In yet a further aspect of the invention, the fraction enriched in cracked and released wax obtained in the sieving treatment as described previously may be further treated to purify the wax, such as by the process described in WO2015/185685A1.

It is noted that the described process uses minimal energy input and disrupts the cellulose fibers to a less extent than the traditional straw pulping method, such as pulping methods carried out at a pressure of 2-4 bar and a pH of 12-14. By the traditional pulping methods using e.g. sodium hydroxide, cellulose can be derived, but this is most often at the cost of disrupting the hemicellulose and lignin, making these plant components commercially unusable. The present invention provides a method by which the length of the cellulose fibers in the product can be controlled, while at the same time providing the further benefit of being non-disruptive, hence facilitating the option of additionally purifying hemicellulose, lignin and even wax for other uses.

II. Methods of Analyzing Products Obtainable by the Present Invention

II.i Fiber Analysis

Fiber length is measured using the Valmet Fiber Image Analyzer, known as the Valmet FS5, which offers a comprehensive set of automated fiber measurements. Fiber length may be reported as lc(n), lc(l) or lc(w), as defined in Carvalho et al 1997. Lc(n)=numerical average length, Lc(l)=length-weighted average length, Lc(w)=weight-weight average length. It is preferred to use the Lc(l) as it better correlates with paper properties and is not so dependent on proportion of fines in the material analyzed. It is noted that according to Carvalho et al 1997, if Lc(w) is used, different assumptions such as the coarseness being directly proportional to fiber length must be met, if this value is to be trusted. Fiber lengths may be measured in different ways and by different apparatuses than the one used in the exemplification of the present invention.

II.ii Folding Endurance

Folding endurance is normally determined using a Schopper type Folding Endurance Type test machine, using strips cut from handsheets formed from the fiber product. Relevant for the present invention, the number of double folds needed to cause breakage of the strips in the test rig are measured. As an example, folding endurance can be determined as follows: Standard handsheets are produced in a handsheet forming rig using 60 g of selected fiber product. A 1.5 centimeters wide paper strip cut from the handsheet is put under 0.5 kg tension and folded using a test machine over a specified radius 135" to the right and 135" to the left. The number of folds required to cause breakage is referred to as the "folding endurance."

II.iii ISO Brightness

ISO optical brightness is measured by making a flat "handsheet" of the fiber product (described above) and putting this into a "Brightness and colour meter/tester", which is a machine with optical measuring capabilities.

II.iv Biomass Composition: Analysis of Lignin, Cellulose, Hemicellulose and Wax Contents Residual lignin content in the cellulose fiber product of the present invention extracted from straw may be determined as follows:

Fibers (4 g, dry matter basis) were stirred into 400 mls water at 75° C. in a 600 ml beaker. After 1 hour of hydration, 12.5 mls of 10% Acetic acid was added, followed by 6.5 g of Sodium Chlorite (NaClO2) and the mixture stirred for 1 hour, maintaining temperature of 75° C. Further aliquots of 10% acetic acid (6.5 mls) and Sodium Chlorite (3 g) were then added and the mix stirred for a further 1 hour at 75° C. At the end of the 2 hours, the fibre residue was carefully filtered out on a fine nylon cloth washed with 200 mls water (3×), 200 mls ethanol (2×) and finally with Dichloromethane (2×), and the fibres were carefully dried (60° C. oven) overnight and then weighed. The difference between the start mass and the oxidised fibre mass was taken as the lignin content, whilst the remaining fibre mass represents "holocellulose", comprising cellulose and any remaining hemicellulose.

Cellulose and residual hemicellulose content in the cellulose fiber product of the present invention extracted from straw may be determined as follows:

2.5 g (dry matter basis) of the lignin-free fibers from above were placed in a 250 ml beaker and to this was added 100 mls of a solution of 0.05 Sodium Borate in 24% potassium hydroxide. The mix was stirred for 2 hours at 20° C., after which time the fibrous residue was recovered using a fine-mesh nylon cloth, washed with 200 mls water (3×), 100 mls 5% acetic acid (1×), 100 mls ethanol (2×) and finally with 100 mls dichloromethane. The residual fibers were dried overnight (60° C. oven) and weighed. The residual mass (adjusted for ash content) was taken as cellulose. The difference between the start mass and this mass was noted as "hemicellulose content.

The total wax content of plant materials can be determined gravimetrically as total extractable lipophilic compounds. Dried plant material is milled and then extracted with hot/boiling chloroform. This is performed by either of two basic methods, where method 2 is preferred over method 1 if the bulk density of the plant material is high.

1. An accurately weighed portion of milled biomass (oven dry) is placed in a soxhlet thimble and then subjected to 12 hour extraction in a soxhlet extraction system, using the standard soxhlet methodology. After extraction, the thimble and remaining solid material are dried at 103° C., and the extracted wax is determined by mass difference compared to the start material. Or, 2. A portion of (accurately weighed) approximately 30 g of dried, milled straw or other plant material is placed into a 2 L round bottomed flask and to this is added 1 Liter of chloroform. The flask is fitted with a reflux condenser and the material is refluxed in Chloroform for a minimum of 3 hours. After this time, the remaining solids are collected quantitatively, then dried (103° C.) and weighed. The wax content is determined via the mass difference with respect to the input material.

III. Products Obtainable by the Present Invention

III.i Cellulose Product

In one aspect of the invention, a cellulose pulp product is provided, such as the bleached-refined cellulose fiber product of a desired fiber length.

In one embodiment of the invention, the cellulose pulp fiber product obtained in step (vii) comprises defibrillated fiber bundles with a length-weighted average fiber length Lc(l) in the range of 0.3-2 mm, such as in the range from 0.4-1.5 mm, e.g. in the range from 0.5-1.2 mm, e.g. in the range from 1-2 mm, preferably in the range from 0.55-1 mm and most preferably in the range from 0.65-1 mm. The length-weighted average fiber length is measured using the Valmet Fiber Image Analyzer as described in section II.

In a preferred embodiment of the invention, the cellulose pulp fiber product obtained in step (vii) comprises defibrillated fiber bundles with a length-weighted average fiber length Lc(l) greater than 0.5 mm, preferably greater than 0.55, 0.60, 0.61, 0.62, 0.63, 0.64, or even preferably greater than 0.65, 0.66, 0.67, 0.68, 0.69, or 0.7 mm, or even preferably greater than 0.72, 0.74, 0.76, 0.78, or 0.8 mm.

For use in bendable materials, it is desired to produce cellulose fibers as long as possible; while for other purposes other lengths may be optimal.

In a preferred embodiment, the cellulose pulp fiber product obtained in step (vii) comprises a cellulose content greater than 70% w/w, such as greater than 75, 80, or 85% w/w, preferably even a cellulose content greater 90, 92, 94, or 96% w/w. The cellulose content is, in the present context, measured using the method described in section II.

An important object of the present invention is to provide a cellulose fiber product comprising at least 80% w/w cellulose and with a mean fiber length Lc(l) greater than 0.4 mm, preferably greater than 0.5, 0.6, or 0.7 mm, or even preferably greater than 0.8 mm.

Another object of the present invention is to provide a cellulose fiber product comprising at least 85 w/w % cellulose, 2-10 w/w % lignin, 4-12 w/w % hemicellulose and having a mean fiber length Lc(l) greater than 0.65 mm.

In another embodiment the cellulose fiber product comprises in the range from 1-15 w/w % lignin, such as in the range from 1-10 w/w % lignin, such as in the range from 2-5, preferably in the range from 2-4 w/w % lignin.

In a further embodiment the cellulose fiber product comprises in the range from 1-20, such as in the range from 1-15 w/w % hemicellulose, such as in the range from 2-10 w/w % hemicellulose, such as in the range from 3-8 w/w % hemicellulose, preferably in the range from 3-5 w/w hemicellulose, The bleached cellulose fiber product is preferably bleached to obtain an ISO brightness in the range of 80-95.

III.ii Hemicellulose Product

In a second aspect of the invention, a hemicellulose product is provided. Such hemicellulose fraction (incl. oligosaccharides) may be obtained after lignin precipitated and can thereby be removed from the liquid phase. The hemicellulose fraction, on a dry matter basis, comprises at least 50%, such as at least 60%, e.g. at least 70%, such as at least 80%, e.g. at least 90% non-cellulose and non-starch oligo- and polysaccharides.

In one embodiment, the hemicellulose product, comprises at least 50%, such as at least 60%, e.g. at least 70%, such as at least 80%, e.g. at least 90% arabinoxylans. In one embodiment the hemicellulose product (incl. oligosaccharides) may comprise 10-90 w/w % xylose, e.g. 20-80 w/w % xylose, e.g. 30-70 w/w % xylose, e.g. 40-60 w/w % xylose, e.g. 50-70 w/w % xylose and preferably 35-60 w/w % xylose and more preferably 40-50 w/w % xylose. The xylose content is, in the present context, measured using the method described in section II.

III.iii Lignin Product

In a third aspect of the invention, a lignin product is provided, comprising at least 60%, preferably in the range of 75-99% w/w, most preferably in the range of 80-95% w/w lignin. In an embodiment the lignin rich product comprises 45-85 w/w % lignin, such as 50-80 w/w % lignin, e.g. in the range from 55-75, such as in the range from 60-70, preferably in the range from 55-65 w/w % lignin and more preferably 60 w/w % lignin. The lignin content is, in the present context, measured using the method described in section II.

III.iv Wax Product

In a fourth aspect of the invention, a wax product is provided, comprising a blend of long chain free fatty acids, long chain fatty alcohols, long chain fatty aldehyde, alkanes, beta diketone, long chain monoesters of fatty acids and alcohols, sterols. The wax product shows a softening ("drop") point between 50-65° C. and is completely molten and liquid above 70 C.

IV. Potential Use of Products Obtainable by the Present Invention

Products of the present invention comprise cellulose, hemicellulose, lignin, and potentially wax; which each has many potential uses.

IV.i Use of Cellulose Product

In one aspect, the present invention provides a cellulose pulp product of high quality with no or very little contamination.

In one embodiment the present invention provides an alternative to the traditional wood pulping method for producing cellulose fiber products. The cellulose pulp fiber product of the present invention may be used in pulp molded materials such as packaging materials selected from the group consisting of egg boxes, packaging for fruit and other foodstuffs, packaging for electrical "whitegoods"; or used in disposable medical products (e.g. vomit-trays and disposable urine bottles for use in hospitals), disposable bedpans; or as well used in other paper type products requiring cellulose fibers. The fiber length of the cellulose fiber product may determine its optimal use, e.g. longer fibers are preferred for bendable egg boxes, while fiber length is of less concern for other non-bendable packaging materials. The purity of the cellulose fiber product obtained by the present invention may be useful for application in other product, such as building materials, toys, cosmetics, nutrition, etc.

The cellulose pulp fiber product of the present invention may be used directly, such as molded into a selected product; or the cellulose fiber product may be mixed with other components. In one embodiment, where the cellulose fiber of the cellulose pulp product product has a length-weighted average fiber length lc(l)>0.6 mm, such as >0.65, preferably >0.7 mm, the cellulose pulp fiber product is mixed with traditional wood pulp, wherein the fiber product provided by the present invention makes up at least 10, 20, 25, 30, or 40% or even 45% of the total amount of cellulose in the final mixed product.

In a further embodiment, the cellulose pulp fibers may be a favorable alternative to traditional wood pulp used to make newsprint, as the lignin content originally present in the wood is responsible for newsprint's yellowing with age, and lignin must therefore be removed from the pulp before high-quality bleached paper can be manufactured.

IV.ii Use of Hemicellulose Product

In a second aspect, the present invention provides a hemicellulose product comprising sugar monomers as well as short and longer oligo-saccharides, and potentially even some remaining larger hemicellulose polymer compounds. In one embodiment, the monomers derived from hemicellulose may be fermented by microbes to fuels or other products of interest. Some microbes naturally metabolize xylose and/or arabinose, while others have been genetically modified to utilize such sugars as a substrate, adding to the list of potential microbial derived products starting from xylose and/or arabinose. In a preferred embodiment, the hemicellulose and/or oligosaccharides are regarded high-value products which may be utilized as food and/or feed additives, such as prebiotic feed component. The oligosaccharides may be used to modulate the gut flora, to affect different gastrointestinal activities and lipid metabolism, to enhance immunity, and/or to reduce diabetes, obesity and cardiovascular risk. In another preferred embodiment, the polysaccharides may be used as hydrocolloid thickeners, components of adhesives, or also as food and/or feed additives similar to the oligosaccharides.

IV.iii Use of Lignin Product

In a third aspect, the present invention provides a lignin product which has many potential uses. In a preferred embodiment it may be used to substitute bitumen in asphalt, which is traditionally derived as a sticky, black, and highly viscous liquid or semi-solid form of petroleum. This is a potential huge market, where the primary use (70%) of asphalt is in road construction as the glue or binder mixed with aggregate particles to create asphalt concrete. Its other main uses are for bituminous waterproofing products, including production of roofing felt and for sealing flat roofs. In another embodiment, the high quality lignin product presents the potential to become a future renewable aromatic resource for the chemical industry, such as a source of phenolic compounds such as phenolic aldehydes and phenolic acids. In yet another embodiment, the lignin product may be considered an antioxidant or a feedstock for producing antioxidant compounds. In yet another embodiment, the lignin product may be considered a combustion product such as for use in maritime diesel for large ships. In a preferred embodiment, the lignin could be used as an adhesive. More specifically, the phenolic nature of lignin makes it prone to replace phenol with lignin derivatives in PF (phenol formaldehyde) resins to formulate wood composite adhesives suitable for e.g. plywood, particleboard and other similar kind of composites, replacing current synthetic PF resins which are based on petrochemical, nonrenewable materials from fossil fuel. Due to the chemical structure of lignin limiting its reactivity, modifications such as methylolation (hydroxymethylation), phenolation, demethylation, and reduction might be introduced to obtain a better adhesive product. However, the lignin derived from gentle processing (such as the method of the present invention) is less "deactivated" as compared to lignin derived from e.g. wood pulping, and thereby potentially more useful and more reactive.

IV.iv Use of Wax Product

In a fourth aspect, the present invention provides a highly valued plant wax product. In one embodiment, the wax product may be used as natural and "green" alternatives to waxes coming from the petrochemical industry. In a further preferred embodiment, the wax product can be substituted for the mineral oil-based waxes, or other natural waxes such as beeswax, carnauba wax etc. in numerous uses, including in cosmetics, medical additives, lubricants, polishes, surface coatings, inks, paints, garments, etc., and even for candle lights.

EXAMPLES

Example 1: Providing Dewaxed Material

Wheat straw was dry mechanically treated as follows: First, straw was hammer-milled and fractionated using an 8 mm sieve. The fraction passing the sieve was then processed in a dust separator for removal of fines material (15-20% of the straw mass was removed as fines material). The longer fraction generated after having removed the fines was then further cleaned of dust by gentle disc-milling (1 mm plate gap in disc mill) and a further circa 5% dust fraction was removed using 0.3 mm sieve. The longer fraction was now mainly straw pieces of length 2-3 mm.

This longer fraction was suspended in 55° C. water, in a jacketed steel tank, at a loading of 85 kilograms minced straw (corresponding to circa 75 kgs straw dry matter) per 1400 liters of water. pH of the resultant slurry was adjusted to pH 5.3 using phosphoric acid and the temperature maintained at circa 55° C. The slurry was stirred using a Myers type dispersion mixer, to ensure good dispersion. 200 ml protease rich preparation (Promod 24L, BioCatalysts Ltd, UK) and 100 ml pectinase rich enzyme preparation (Pectinase 974L, BioCatalysts Ltd, UK) were added to disrupt the straw cuticle and help release constituent wax. The slurry was circulated through a Fryma type wet-mill (fitted with a toothed colloid milling head) with a wide mill (>2 mm) head gap, meaning that the mill is acting as an effective pump mixer, rather than a true grinding mill, helping ensure access of the enzymes to the straw cuticular surface. The wet-milling and stirring was applied during enzymatic treatment while maintaining pH and temperature profile specified above. After 1 hour, the temperature of the slurry was raised to 80° C. to ensure all waxy components are in a molten state; and the mixture was further stirred for 10 minutes. The insoluble fibrous fraction was then separated from the bulk process liquor via decanter centrifuge using a GEA UCD 2015 2-phase decanter, running with a feed rate of 1800 liter slurry per hour, with a barrel speed of 5500 rpm. This product is referred to as dewaxed material.

Example 2: Production of Cellulose Fibers

It is an object of the present invention to control the fiber length of the cellulose product of the invention. As is evident from the below examples, it was identified that the extent of refining significantly effects the cellulose fiber length, not just the duration of refining, but also when refining is performed as part of the multiple steps of processing lignocellulosic biomass to a cellulose fiber product. The different conditions tested are specified below, while the resulting fiber lengths of the different samples are reported in Table 1 in section 2.8.

2.1 Refining (Wet-Mill) During Enzymatic Treatment and Bleaching Stage

Sample 1 was prepared as described in the following steps:

1. Dewaxed straw was provided as described in example 1.
2. 60 kg dewaxed straw was suspended in water at a ratio of 20:1 (water to straw) in a jacketed tank fitted with mechanical stirrer. The temperature was brought to 55° C. and pH was adjusted to pH 5.3, using phosphoric acid. 300 g Xylanase rich enzyme preparation (Depol 333P, BioCatalysts Ltd, UK) and a 100 ml ferulic esterase rich enzyme preparation (Depol 740L, BioCatalysts Ltd, UK) were added. Enzymatic hydrolysis was performed for 2 hours, with mechanical stirring, while maintaining pH and temperature profile specified above. The straw was continuously refined during enzymatic hydrolysis by circulation through a Fryma type, toothed colloid, wet-mill, with head gap set at 1.5 mm.

3. Hydrolysis was terminated by raising the pH to 10.5 via addition of NaOH as well as raising the temperature to 80° C. Stirring was continued for a further 15 minutes.
4. The insoluble fibers were separated from the aqueous liquid phase by decanter centrifuging using a GEA UCD 205 2-phase decanter, running 1800 liter slurry per hour with a speed of 5500 rpm. The aqueous liquid phase was removed for potential downstream processing to recover hemicelluloses and lignin. The remaining fibrous solids were recovered with a dry matter content of 23% dry matter.
5. The fibrous solids were re-suspended in water (20:1) in a jacketed tank, adjusting the pH to 10.5 (using NaOH) and raising the temperature to 80° C., whilst mechanically stirring. Hydrogen peroxide (H2O2, 30% in water by VWR, Denmark) was added to commence bleaching.
6. The fiber material was bleached and refined simultaneously, with stirring, for 180 minutes (T1=0 min, T2=180 min), maintaining temperature and pH, with additions of H2O2 as needed. 5 litres of 30% H2O2 is initially added per 40 kg charge of fibre mass. A total of 10 litres of H2O2 was added during the bleaching period. During bleaching, the pH was observed to drop, so pH was adjusted back to 10.5 via periodic additions of NaOH (alkali). The straw was refined during bleaching by wet-milling by circulation through a Fryma type, toothed colloid, wet-mill, with head gap set at 1-1.5 mm.
7. After the 180 minutes, the pH of the bleached fibrous slurry was rapidly adjusted down to pH 7.5 by addition of orthophosphoric acid.
8. The bleached cellulose fibers were then separated from the bulk aqueous bleaching liquor by centrifugal decanting using a GEA UCD 205 2-phase decanter, running 1800 liter slurry per hour with a speed of 5500 rpm Sample 2: Dewaxed straw was treated as described above for sample 1, except that the simultaneous bleaching and refining (step 6) was carried out for 120 minutes (T1=0 min, T2=120 min).

2.2 Refining (Wet-Mill) Only During Bleaching Stage

Sample 3: Dewaxed straw was treated as described above for sample 1, except that wet-mill refining was not performed during the enzymatic treatment (step 2). During the 2 hours of enzymatic treatment, the mixture was merely stirred and not processed through a wet-mill.

Figure 2:
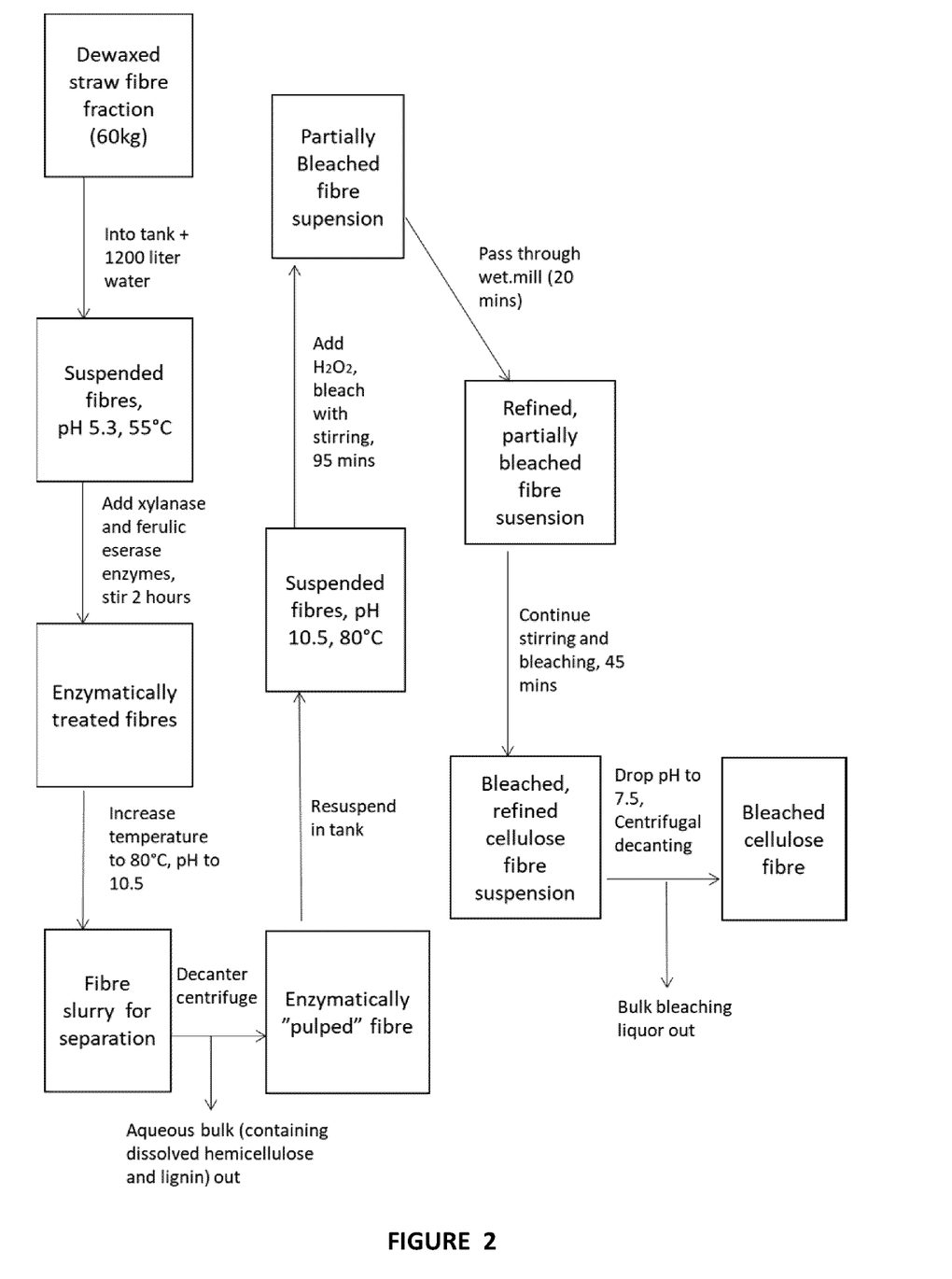
FIG. 2 illustrates the process steps applied to sample 4A in example 2.

2.3 Refining (Wet-Mill) Only for a Short "Critical" Period During Bleaching Stage Sample 4A: Dewaxed straw was treated as described above for sample 3, except that wet-mill refining in the bleaching stage (step 6) was not performed all through bleaching but rather only performed for a short critical period during the bleaching. More specifically, after 95 minutes of bleaching (T1=95 min) (time calculated from time that bleaching agent $H_2O_2$ was first added in step 5), refining was initiated by wet-mill treating the mixture, more specifically by circulation of the fibre slurry through a Fryma type, toothed colloid, wet-mill, with head gap set at 1-1.5 mm. Wet-milling refining was performed for 20 minutes (T2=20 min), during which time the total tank volume passed through the refiner at least one time. Further, after the 20 minutes, stirring and bleaching was continued for a further 45 minutes (T3=45 min). The pH of the bleached fibrous slurry was then rapidly adjusted down to pH 7.5 by addition of orthophosphoric acid, followed by separating and washing the fibers (as described in step 7 and onwards). The process steps applied to sample 4A are illustrated in FIG. 2.

Sample 4B: same as sample 4A, except that T1=80 min.
Sample 4C: same as sample 4A, except that T1=70 min.
Sample 5A: Dewaxed straw was treated as described above for sample 4A, except that after the 20 minutes of wet-mill refining (T2=20 min) (115 minutes of total bleach time), the slurry pH was immediately dropped to 7.5 using phosphoric acid (T3=0 min), and the fibres were isolated via decanting using a GEA UCD 205 2-phase decanter. Subsequent monitoring of average fibre length of the separated fibres indicated a non-optimal value.

Sample 5B: The fibers of sample 5A were resuspended in 400 litres of water at 80 C, pH raised again to 10.5 (using NaOH) and a further 2 L of $H_2O_2$ added to the tank. The mixture was mechanically stirred for additional 45 minutes (T3=45 min) under these conditions, after which time the pH was dropped to 7.5 using phosphoric acid (160 minutes of total bleach time) and the fibres again separated from the aqueous liquor via centrifugal decanting.

Samples 6A and 6B: Dewaxed straw was treated as described above for sample 4A, except that after the 20 minutes of wet-milling refining (T2=20 min), the sample was split and for sample 6A bleaching was continued for 45 min (T3=45 min), while for sample 6B bleaching was continued for 120 minutes (T3=120 min).

2.4 Refining (Wet-Mill) During Enzymatic Treatment and for a Short "Critical" Period During Bleaching Stage Sample 7: Dewaxed straw was treated as described above for sample 1, except that wet-mill refining in the bleaching stage (step 6) was not performed all through bleaching but rather only performed for a short critical period during the bleaching as described in sample 4A, but having T1=115 min. T2=20 min (1 pass), and T3=45 min.

2.5 Refining (Disc Atmospheric Refiner) During Enzymatic Treatment and Bleaching Stage Sample 8 (method comparable to WO2018/086672A1) was prepared similar to sample 1, except that a disc atmospheric refiner at pilot scale was used instead of wet-mill refining. The following steps were carried out:

1. Dewaxed straw was provided as described in example 1.
2. 4.5 kg dewaxed straw was suspended in water at a ratio of 20:1 (water to straw) in a 120 L jacketed tank fitted with mechanical stirrer. The temperature was brought to 55° C. and pH was adjusted to pH 5.3, using phosphoric acid. Xylanase rich enzyme preparation (Depol 333P, from BioCatalysts Ltd, UK) and a ferulic esterase rich enzyme preparation (Depol 740L, from BioCatalysts Ltd, UK) was added at a dosage of 20 g per 5 kg of dewaxed straw input. Enzymatic hydrolysis was performed for 2 hours, with mechanical stirring, while maintaining pH and temperature profile specified above. The straw was refined 3 times during enzymatic hydrolysis by passing through a Sprout Waldron model 105-A pilot-scale single rotating disc atmospheric refiner, with plate gap set at 15 thousands of an inch.
3. Hydrolysis was terminated by raising the pH to 10.5 via addition of NaOH as well as raising the temperature to 80° C. Stirring was continued for a further 10 minutes.
4. The insoluble fibers were separated from the aqueous liquid phase by decanter centrifuging, using a GEA UCD 205 2-phase decanter. The aqueous liquid phase was removed and discarded in this particular trial run. The remaining fibrous solids were recovered with a dry matter content of 23% dry matter.

5. The fibrous solids were re-suspended in water (20:1/5% consistency) in a jacketed tank, adjusting the pH to 10.5 (using NaOH) and raising the temperature to 80° C., whilst mechanically stirring. Hydrogen peroxide ($H_2O_2$) was added to commence bleaching.
6. The fiber material was bleached, with stirring, for 180 minutes (T1=0 min, T2=180 min), maintaining temperature and pH, with additions of $H_2O_2$ as needed. 0.5 litres of 30% $H_2O_2$ is initially added per 4 kgs charge of fibre mass. A total of 1.1 litres of $H_2O_2$ was added during the bleaching period. During bleaching, the pH was observed to drop, so pH was adjusted back to 10.5 via periodic additions of NaOH (alkali). The straw was refined 4 times during the bleaching process by using 4 passes, at 36 minute intervals, through a Sprout Waldron model 105-A pilot-scale single rotating disc atmospheric refiner, with plate gap set at 15 thousands of an inch using 12 inch plates.
7. After the 180 minutes, the pH of the bleached fibrous slurry was rapidly adjusted down to pH 7.5 by addition of orthophosphoric acid (T3=0 min).
8. The bleached cellulose fibers were then separated from the bulk aqueous bleaching liquor by centrifugal decanting, using a GEA UCD 205 2-phase decanter.
9. The bleached fibers were finally washed by rinsing with fresh water and then manually "squeezed dry" over a 100 micron mesh sieve.

2.6 Refining (Disc Refiner) Only for a Short "Critical" Period During Bleaching Stage Sample 9 was prepared similar to sample 4A, except that a disc atmospheric refiner at pilot scale was used instead of wet-mill refining. The following steps were carried out:
1. Dewaxed straw was provided as described in example 1.
2. The dewaxed straw was enzymatically treated as with sample 4A (xylanase and ferulic esterase treatment followed by termination of hydrolysis by pH increase; then separation of insoluble fibers from liquid by decanter centrifuge).
3. 3.6 kgs fibrous solids (dry matter basis) was then resuspended in water in a 120 L jacketed, temperature controlled tank, fitted with mechanical stirrer, to an approximate consistency of 4%, at a temperature of 80° C., with pH adjusted to 10.5 (via addition of NaOH).
4. Bleaching was commenced via addition of 500 mls of 30% H2O2, with the material only being mechanically stirred in the tank, for a period of 95 minutes (T1=95 min), with addition of a further 0.5 L 30% $H_2O_2$ in 0.1 L aliquots during the period T1. pH was maintained at 10.5 via periodic additions of NaOH.
5. At 95 minutes, the slurry/suspension was passed a single time (T2=1 pass) through a Sprout Waldron model 105-A pilot scale single rotating disc atmospheric refiner, with plate gap set at 15 thousands of an inch (circa 350-400 microns) using 12 inch plate.
6. The refined material was then returned to the tank and stirred for a further 40 minutes (T3=40 min) at 80° C. and pH 10.5, after which time pH was rapidly reduced to 7.5 (using phosphoric acid).
7. The bleached, insoluble cellulose fibers were then separated from the bulk aqueous bleaching liquor by centrifugal decanting using a GEA UCD 205 2-phase decanter.

2.7 Cellulose Fibers from Non-Dewaxed Straw

Sample 10: Non-dewaxed straw was treated as described above for sample 4A—i.e. 60 kg hammer-milled straw (no prior dewaxing) was suspended in water and the following process steps were carried out as described for sample 4A. The resulting length weighted average fiber length, Lc(l), of sample 10 was 0.404 mm.

2.8 Cellulose Fibers from Conventional Alkaline Pulping and Bleaching

Sample 11: Conventional pulping and bleaching was performed on wheat straw (non-dewaxed) as follows: Straw was hammer-milled. The hammer milled straw was introduced at 4% consistency (dry matter basis) to water, to which 3M NaOH was added to pH 13 (120 g fibers in 3 liters total pulping liquor). The slurry was stirred at 100° C. for 90 minutes. Excess liquid was drained off, leaving a wet fiber mass at 12% dry matter. The fibrous mass was then added to 2 liters of alkaline (pH 10.5) water at 80° C., and bleached via addition of hydrogen peroxide (35% solution in water) with stirring for 90 minutes, maintaining pH at 10.5 by stepwise dosing with 3 M NaOH solution. Then passed one time through lab wet mill, and then further bleached with stirring for a further 45 mins. pH was rapidly dropped to 7.5 via addition of phosphoric acid. Fiber length was measured using Valmet Fibre analyzer. Length weighted average fiber length, Lc(l), was 0.422 mm Sample 12: Conventional pulping and bleaching was performed as described for sample 11, but on dewaxed straw provided as described in example 1. The resulting length weighted average fiber length, Lc(l), was 0.501 mm 2.8 Results: Fiber Length Fiber processing was monitored by using the "Lc(l)" and "Lc(w)" parameters for fiber length, more specifically the length weighted and weight weighted, respectively, average fiber length within a pulp sample (as measured and determined using the standard fiber analyzer instrument Valmet image analysis basis as descried in section II). Fiber lengths of the different samples 1-10 are presented in table 1.

TABLE 1

Fiber data

| | | | | Fiber length (mm) | | |
|---|---|---|---|---|---|---|
| Sample # | T1 | T2 | T3 | Lc(n) | Lc(l) | Lc(w) |
| Wet mill refining | | | | | | |
| 1* | 0 | 180 min (9 passes) | 0 | 0.188 | 0.409 | 0.801 |
| 2* | 0 | 120 min (6 passes) | 0 | 0.229 | 0.481 | 0.958 |
| 3 | 0 | 180 min (9 passes) | 0 | 0.208 | 0.510 | 1.028 |
| 4A | 95 min | 20 min (1 pass) | 45 min | 0.368 | 0.732 | 1.176 |
| 4B | 80 min | 20 min (1 pass) | 45 min | 0.305 | 0.645 | 1.021 |
| 4C | 70 min | 20 min (1 pass) | 45 min | 0.307 | 0.602 | 0.936 |
| 5A | 95 min | 20 min (1 pass) | 0 | 0.311 | 0.648 | 1.098 |
| 5B | 95 min | 20 min (1 pass) | 45 min | 0.353 | 0.802 | 1.393 |
| 6A | 95 min | 20 min (1 pass) | 45 min | 0.452 | 0.745 | 1.103 |
| 6B | 95 min | 20 min (1 pass) | 120 min | 0.249 | 0.552 | 0.843 |
| 7* | 115 min | 20 min (1 pass) | 45 min | 0.202 | 0.494 | 1.148 |
| Disc atmospheric refiner | | | | | | |
| 8* | 0 | 180 min (4 passes) | 0 | 0.206 | 0.475 | 0.855 |
| 9 | 95 min | 2 min (1 pass) | 40 min | 0.456 | 0.782 | 1.213 |

TABLE 1-continued

Fiber data

| Sample # | T1 | T2 | T3 | Lc(n) | Lc(l) | Lc(w) |
|---|---|---|---|---|---|---|
| | | | | Fiber length (mm) | | |
| Non-dewaxed straw (wet mill refining) | | | | | | |
| 10 | 95 min | 20 min (1 pass) | 45 min | 0.171 | 0.404 | 0.838 |

*wet mechanical treatment during hemicellulase pretreatment

An object of the invention was to provide long fibres, such as preferably fibers of at least Lc(l) 0.65 mm, as such long fibers are particularly suitable for manufacturing of egg trays or other packaging material where needs to be bendable (such as the opening/closing of a standard egg box).

Wet-mill refining was originally carried out during the hemicellulase treatment of the dewaxed straw and also throughout the bleaching (samples 1 and 2). However, in scenarios in which wet-mill refining is carried out throughout the enzymatic phase and the bleaching stage, lc(l) values of only circa 0.4 mm are common for the fiber product (see table 1). If wet-mill refining is restricted to the bleaching stage only (sample 3), the fiber length lc(l) increases to circa 0.5 mm (see table 1). However, if wet-mill refining is only performed at a critical stage of bleaching, for a limited time (sample 4), lc(l) values of at least 0.6 mm, up to 0.8 mm are routinely achieved (see table 1).

A period of bleaching (T1) prior to refining is beneficial for obtaining long fibers. If T1 is less than 60 minutes (data not shown), the resulting fibers (T2=one pass, T3=95 min) are too coarse to measure in the automated fiber analyzer. Meanwhile, for T1=60-95 min, the fiber length increases as T1 increases (samples 4A, 4B, and 4C).

Continued stirred bleaching for a "maturation period" (T3) after the limited time wet-mill refining step was further demonstrated to be beneficial for obtaining long fibers (sample 5A and 5B), while too long continued bleaching was found to be non-favorable for providing long fibers (sample 6A and 6B). It was further shown that the long fibers obtainable from refining at a critical stage during bleaching (sample 4A, 5B, 6A) are not produced if refining has also been performed during hemicellulase treatment (sample 7).

The surprising importance of providing dewaxed straw for the present method (compared to using straw which has not been dewaxed) was demonstrated. Treatment of non-dewaxed straw by the method steps of the present invention gives lc(l) values of only circa 0.4 mm (sample 10).

It was also demonstrated that long fibers can be produced from dewaxed straw by disc refining a pilot scale. Similar to the wet-mill refining results, it was shown that when using a disc refining at pilot scale it is critical to only refine for a short time (1 pass) during bleaching (sample 9). Meanwhile, refining during the enzymatic treatment and bleaching steps (sample 8) critically reduces the Lc(l) value compared to refining only for a short critical period during bleaching (sample 9).

Based on these results, it is speculated that it is critically important to refine the straw fiber "bundles" to the final "fibers" at a stage at which the bundles are not brittle, but rather are flexible and free of encrusting lignin, such as after a set time (T1) during the bleaching stage. At this point it is advantages to perform a limited refining process (T2) equivalent to a single or maximally a double pass of the fibers through a refiner disc or wet-milling head, at this critical point in the bleaching process, to obtain the desired longer bleached straw fibers.

2.9 Results: Composition of Cellulose Fiber Product

The composition of sample 4 was analyzed to determine cellulose, lignin, and hemicellulose content as described in section II. The following values were obtained, table 2:

TABLE 2

Composition analysis

| | Cellulose (% on DM basis) | Lignin (% on DM basis) | Hemi-cellulose (% on DM basis) | Wax | Other* (% on DM basis) |
|---|---|---|---|---|---|
| Raw wheat straw (starting material) | 39% | 14.5% | 32.5% | 1.7% | 12.3% |
| Final cellulose fiber product | 94% | 2% | 1.5% | — | 2.5% |

*Other includes proteins, pectic polysaccharides, sugars, phenolics, hydrophilic extractives and ash.

Example 3: Cellulose Fiber Handsheets: Folding Endurance

The cellulose fiber products (produced in example 2) were made into standard handsheets: Standard handsheets were produced in a handsheet forming machine using 60 g of selected test pulps. Folding endurance was determined using a Schopper type Folding Endurance Type test machine: a 1.5 centimeters wide paper strip cut from the handsheet was put under 0.5 kg tension and folded using the test machine over the specified radius 135" to the right and 135" to the left. The number of folds required to cause breakage are reported in table 3, referred to as the "folding endurance."

The longer fibers (lc(l) mean values >0.7 mm) clearly showed greater folding endurance compared to the shorter fibers. Such improved folding endurance is for example an advantage in bendable packaging materials such as in egg boxes with a lid made in one piece.

TABLE 3

Folding endurance

| Sample | 1 | 2 | 3 | 4 | 5B | 8 |
|---|---|---|---|---|---|---|
| Mean number of folds to break | 5 | 15 | 21 | 45 | 55 | 14 |

EMBODIMENTS OF THE INVENTION

1. A method of isolating and preparing cellulose fibers of a desired length from a lignocellulosic biomass, said method comprising the steps:
   (i) providing dewaxed lignocellulosic material in aqueous suspension,
   (ii) adjusting the pH to alkaline conditions and increasing the temperature of the solution in step (i) to solubilize hemicellulose and lignin components in the aqueous phase,
   (iii) separating the material obtained in step (ii) into a solid cellulose fiber fraction and a liquid fraction comprising hemicellulose and lignin components,
   (iv) suspending said cellulose fiber fraction obtained in step (iii) in an aqueous liquid, adjusting the temperature to 65-95° C. and pH to 9-11.5, adding a bleaching agent, and keeping said cellulose fiber fraction in suspension for a time T1,
(v) subjecting the bleached material obtained in step (iv) after the time T1 to a wet mechanical treatment for a duration of time T2,
(vi) obtaining a cellulose fiber product by separating the material obtained in step (v) into a bleached-refined solid cellulose fiber fraction and an aqueous bleaching liquor fraction, and
(vii) optionally washing the bleached-refined cellulose fiber fraction in an aqueous liquid.
wherein said dewaxed lignocellulosic material is obtained by subjecting said lignocellulosic biomass to a pretreatment comprising dry mechanical treatment and enzymatic treatment, and
wherein T1 and T2 are selected to obtain cellulose fibers of a desired length based on a correlation between the fiber length and T1 and T2.
2. The method according to claim 1, said method comprising an additional step (v') following step (v), prior to step (vi), wherein said additional step (v') comprises:
(v') continuing bleaching at temperature 65-95° C. and pH 9-11.5 for a duration of time T3 without wet mechanical treatment, wherein in T3 is selected based on a correlation between the fiber length and T1, T2 and T3.

The invention claimed is:
1. A method of isolating and preparing cellulose fibers of a desired length-weighted average fiber length lc(l) from cereal straw, the method comprising:
(i) subjecting the cereal straw to a pretreatment comprising a dry mechanical treatment to remove parts of the cuticular wax from the cereal straw followed by enzymatic pretreatment using one or more protease and/or pectinase enzymes in aqueous suspension to remove remaining cuticular wax from the cereal straw, thus obtaining a solution comprising dewaxed straw material in aqueous suspension,
(ii) solubilizing hemicellulose and lignin components of the solution in (i) by adjusting the pH and increasing the temperature of the solution to pH 9-11.5 and temperature of 65-95° C. to provide a material,
(iii) separating the material obtained in (ii) into a solid cellulose fiber fraction and a liquid fraction comprising solubilized hemicellulose and lignin components,
(iv) suspending the solid cellulose fiber fraction obtained in (iii) in an aqueous liquid, adjusting the temperature and pH of the aqueous liquid to a temperature of 65-95° C. and pH 9-11.5, adding a bleaching agent, and keeping the cellulose fiber fraction in suspension for 60-180 minutes (T1) to provide a bleached material,
(v) subjecting the bleached material obtained in (iv) to a wet mechanical refining treatment to provide a bleached-refined material,
(vi) continuing bleaching at a temperature 65-95° C. and a pH 9-11.5 for a duration of 20-90 minutes (T3) without wet mechanical treatment,
(vii) obtaining a cellulose fiber product by separating the bleached-refined material obtained in (vi) into a bleached-refined solid cellulose fiber fraction and an aqueous bleaching liquor fraction, and
(viii) optionally washing the bleached-refined cellulose fiber fraction in an aqueous liquid,
wherein the length-weighted fiber length lc(l) of the cellulose fibers is >0.6 mm.

2. The method according to claim 1, wherein step (i) further comprises removal of the cuticular wax from the solution, to provide dewaxed solid lignocellulosic material in aqueous suspension.

3. The method according to claim 2, further comprising a second enzymatic treatment of the cereal straw after removal of the cuticular wax therefrom using one or more enzymes, selected from the list consisting of proteases, pectinases, hemicellulases, and ligninases.

4. The method according to claim 2, wherein the hemicellulases are selected from xylanases and ferulic esternase.

5. The method according to claim 1, wherein the wet mechanical refining treatment of (v) is performed using a refiner operated at atmospheric pressure.

6. The method according to claim 1, wherein the wet mechanical refining treatment in (v) is performed using a refiner or a mill.

7. The method according to claim 1, wherein the wet mechanical refining treatment in (v) is equivalent to 1-2 passes (T2) through a single rotating disc atmospheric refiner, with plate gap set at 350-400 microns, using 12 inch plate, and processing 3000-5000 liters sample/hour.

8. The method according to claim 1, wherein T1 is 60-120 minutes.

9. The method according to claim 1, wherein T3 is 25-60 minutes.

10. The method according to claim 1, wherein the bleaching agent added in (iv) is selected from the group consisting of hydrogen peroxide, chlorine, hypochlorite, chlorine dioxide, sodium percarbonate, active oxygen, ozone, or mixtures thereof.

11. The method according to claim 1, wherein the material obtained from the dry mechanical pretreatment is fractionated according to size prior to the enzymatic pretreatment.

12. The method according to claim 1, wherein the enzymatic pretreatment comprises a wet mechanical treatment.

13. The method according to claim 1, wherein pretreatment further comprises:
a) subjecting the cereal straw obtained from the dry mechanical treatment to a sieving treatment and obtaining at least two fractions, wherein the at least two fractions comprise a first fraction passing through the sieve mesh and a second fraction being retained by the sieve mesh,
b) suspending the second fraction obtained in (a) in an aqueous liquid together with one or more protease and/or pectinase enzymes to provide a mixture,
c) subjecting the mixture obtained in (b) to wet mechanical treatment,
d) removing wax from the mixture following the wet mechanical treatment to obtain a dewaxed mixture,
e) enzymatically treating the dewaxed mixture obtained in (d) using one or more hemicellulase enzymes.

* * * * *